(12) United States Patent
Kikuchi et al.

(10) Patent No.: US 6,791,675 B2
(45) Date of Patent: Sep. 14, 2004

(54) OPTICAL WAVEGUIDE PATH, MANUFACTURING METHOD AND COUPLING METHOD OF THE SAME, AND OPTICAL WAVEGUIDE PATH COUPLING STRUCTURE

(75) Inventors: Hideo Kikuchi, Tokyo (JP); Kiminori Ishido, Tokyo (JP)

(73) Assignee: NEC Toppan Circuit Solutions, Inc., Tokyo (JP)

( * ) Notice: Subject to any disclaimer, the term of this patent is extended or adjusted under 35 U.S.C. 154(b) by 307 days.

(21) Appl. No.: 09/995,616

(22) Filed: Nov. 29, 2001

(65) Prior Publication Data

US 2002/0064345 A1 May 30, 2002

(30) Foreign Application Priority Data

Nov. 30, 2000 (JP) ........................................ 2000-366411

(51) Int. Cl.[7] .................................................. G01J 5/56
(52) U.S. Cl. ............................ 356/50; 356/43; 356/30; 356/131
(58) Field of Search ............................. 385/14, 39, 42, 385/43, 30, 47, 131, 132, 52, 50

(56) References Cited

U.S. PATENT DOCUMENTS

| 5,627,928 A | * | 5/1997 | Matsuura et al. ............. 385/43 |
| 5,999,670 A | * | 12/1999 | Yoshimura et al. ......... 385/141 |
| 6,330,378 B1 | * | 12/2001 | Forrest et al. ................. 385/50 |
| 6,434,282 B1 | * | 8/2002 | Binkley et al. ............. 385/131 |
| 6,483,967 B2 | * | 11/2002 | Tang et al. .................... 385/43 |
| 6,490,392 B1 | * | 12/2002 | Munekata et al. ............. 385/31 |
| 6,633,699 B1 | * | 10/2003 | Legay et al. .................. 385/30 |

* cited by examiner

Primary Examiner—Michael P. Stafira
Assistant Examiner—Juan D Valentin, II
(74) Attorney, Agent, or Firm—McGinn & Gibb, PLLC

(57) ABSTRACT

An optical waveguide path coupling structure is realized without requiring highly accurate alignment.

In an optical waveguide path coupling structure, a first optical waveguide path arranged on an optical device chip, which has a first cross section formed such that a core layer is exposed as an oblique plane with a slight angle θ of approximately 6 degrees, for example, at an end portion and a second cross section formed in an approximately vertical direction to the first cross section at a position apart from the first cross section by a predetermined distance, and a second optical waveguide path arranged on a base substrate, which has a first cross section formed such that the core layer is exposed as an oblique plane with a slight angle θ of approximately 6 degrees, for example, at an end portion and a second cross section formed in the approximately vertical direction to the first cross section at a position apart from the first cross section by a predetermined distance, are coupled by aligning the first cross sections and the second cross sections.

17 Claims, 17 Drawing Sheets

FIG.1

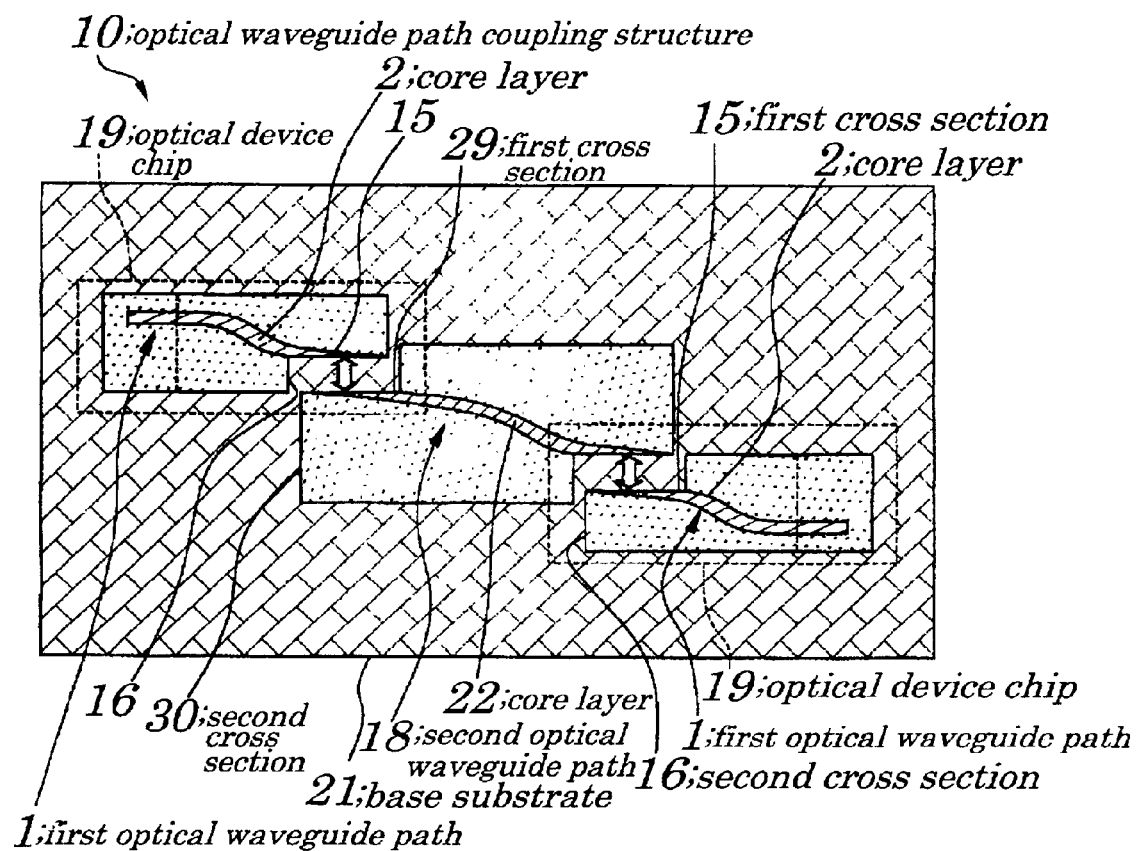

- 10; optical waveguide path coupling structure
- 19; optical device chip
- 2; core layer
- 15; first cross section
- 29; first cross section
- 15; first cross section
- 2; core layer
- 16
- 30; second cross section
- 22; core layer
- 19; optical device chip
- 18; second optical waveguide path
- 1; first optical waveguide path
- 21; base substrate
- 16; second cross section
- 1; first optical waveguide path

FIG.2

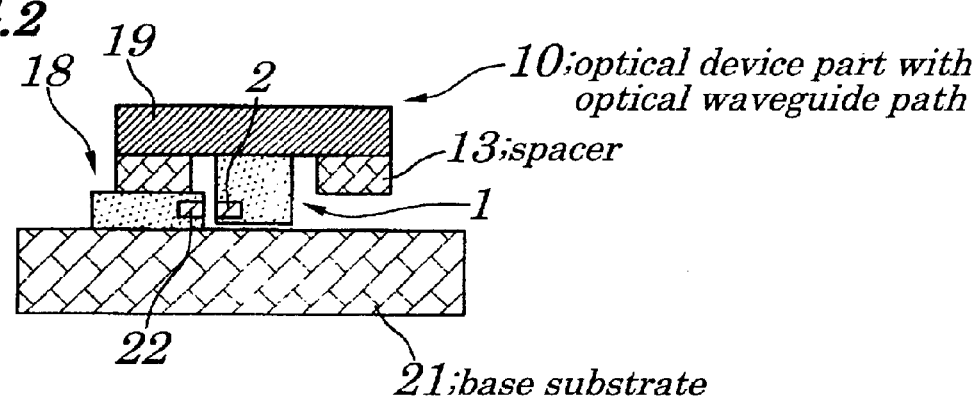

- 18
- 19
- 2
- 10; optical device part with optical waveguide path
- 13; spacer
- 1
- 22
- 21; base substrate 18; second optical waveguide path

OPTICAL WAVEGUIDE PATH, MANUFACTURING METHOD AND COUPLING METHOD OF THE SAME, AND OPTICAL WAVEGUIDE PATH COUPLING STRUCTURE

BACKGROUND OF THE INVENTION

1. Field of the Invention

The present invention relates to an optical waveguide path coupling structure and a coupling method of an optical waveguide path, an optical waveguide path and its manufacturing method, and an optical device part with the optical waveguide path and its manufacturing method. More particularly, the present invention relates to the optical waveguide path coupling structure and the coupling method of the optical waveguide path, the optical waveguide path and its manufacturing method, and the optical device part with the optical waveguide path and its manufacturing method using a film in which upper and lower surfaces of a core layer are coated with an upper clad layer and a lower clad layer.

The present application claims priority of Japanese Patent Application No. 2000-366411 filed on Nov. 30, 2000, which is hereby incorporated by reference.

2. Description of the Related Art

Optical communication technology utilizing light as a transmission medium of information has been widely used. To execute such optical communication technology, an optical waveguide path coupling structure (an optical module) is used where optical device chips, such as a light-emitting device and a light-receiving device are provided on an optical device substrate and the optical device chips are optically coupled with each other via an optical waveguide path. It is required that information is transmitted in the optical waveguide path suppressing attenuation of light in order to perform such optical transmission.

FIG. 34 is a sectional view showing an example of a conventional optical waveguide path coupling structure. An optical waveguide path coupling structure 100, as shown in FIG. 34, includes: a quarts glass substrate 105 attached with a film 104 in which upper and lower surfaces of a core layer 101 are coated with an upper clad layer 102 and a lower clad layer 103; and an optical device substrate 107 attached with an optical device chip 106 such as a PD (a photo diode) or a VCSEL (a vertical cavity surface emitting laser).

A specular surface 108 having a slope approximately slanting by 45 degrees is formed on one end of the film 104, and light transmitted through the core layer 101 as shown by an arrow from the other end of the film 104 as the optical waveguide path is made to convert its optical path in an vertical direction by the specular surface 108. Then, light vertically converted is converted into a parallel light by a first micro lens 109 arranged on a rear surface of the quarts glass substrate 105 to be emitted toward the optical device chip 106.

On the other hand, a second micro lens 110 is arranged on a position, which opposes to the first micro lens 109 on the optical device chip 106 of the optical waveguide path, via a resin layer 111, and the light emitted from the first micro lens 109 is made incident to the second micro lens 110 and received by the optical device chip (the light-receiving device in this case) 106 via the resin layer 111. On the contrary, when the light-emitting device is used as the optical device chip 106, the light emitted from the light-emitting device is made incident from the second micro lens 110 to the first micro lens 109 and passes the core layer 101 of the film 104 as the optical waveguide path traveling through an opposite route in the foregoing case. Note that both the quarts glass substrate 105 and the optical device substrate 107 are assembled on a base substrate 113 such as a printed substrate via bumps 112.

However, since the conventional optical waveguide path coupling structure 100 requires the micro lenses 109,110 to convert the light passing through the optical waveguide path into the parallel light and the micro lenses 109,110 must be aligned in a predetermined position with high accuracy, there exists a problem that a manufacturing cost increases.

Specifically in FIG. 34, since the micro lens 109 must be arranged in the predetermined position with high accuracy of approximately 1 μm in order to arrange the micro lens 109 on the quarts glass substrate 105, a highly accurate alignment operation is required for arranging the micro lens 109, and thus increase of the manufacturing cost has been inevitable.

SUMMARY OF THE INVENTION

In the view of the above, it is an object of the present invention to provide an optical waveguide path coupling structure and a coupling method of an optical waveguide path, the optical waveguide path and its manufacturing method, and an optical device part with the optical waveguide path and its manufacturing method, whereby a highly accurate alignment is unnecessary.

According to a first aspect of the present invention, there is provided an optical waveguide path coupling structure where a first optical waveguide path including a first core layer and a second optical waveguide path including a second core layer are optically coupled, wherein the first optical waveguide path arranged on an optical device chip, which has a first cross section formed such that the first core layer is exposed as an oblique plane with a slight angle at an end portion and a second cross section formed in an approximately vertical direction to the first cross section at a position apart from the first cross section by a predetermined distance, and the second optical waveguide path arranged on a base substrate, which has a first cross section formed such that the second core layer is exposed as an oblique plane with a slight angle at an end portion and a second cross section formed in the approximately vertical direction to the first cross section at a position apart from the first cross section by a predetermined distance, are coupled by aligning the first cross sections and the second cross sections.

According to a second aspect of the present invention, there is provided an optical waveguide path including a film in which upper and lower surfaces of a core layer are multiply coated respectively by an upper clad layer and a lower clad layer, wherein a first cross section with a slight angle to an optical path direction is formed at an end portion side of the core layer on the film to expose the core layer, and a second cross section is formed having a predetermined cross angle with the first cross section.

In the foregoing second aspect, a preferable mode is one wherein the first cross section is a plane approximately perpendicular to a plane of the film.

Also, a preferable mode is one wherein the first cross section is a plane forming a predetermined cross section non-perpendicular to the plane of the film.

Further, according to a third aspect of the present invention, there is provided an optical waveguide path including a film with a lower clad layer, a core layer, a thin film upper clad layer, and a side clad layer having approximately a same height as the core layer, wherein the core layer for alignment used as the pattern for alignment is formed on the film other than the core layer and a first cross section with a slight angle to an optical path direction is formed at an end portion side of the core layer for the alignment to expose the core layer for the alignment, and a second cross section is formed having a predetermined cross angle with the first cross section to expose an end surface of the core layer.

According to a fourth aspect of the present invention, there is provided a manufacturing method of an optical waveguide path using a film in which upper and lower surfaces of a core layer are multiply coated respectively by an upper clad layer and a lower clad layer, the manufacturing method including the steps of: forming a first cross section with a slight angle to an optical path direction at an end portion of the film; measuring a position of the core layer exposed at the first cross section; and forming a second cross section with a predetermined angle from the optical path direction of the film at a position apart from the position of the core layer by a predetermined distance.

According to a fifth aspect of the present invention, there is provided a manufacturing method of an optical waveguide path using a film in which upper and lower surfaces of a core layer are multiply coated respectively by an upper clad layer and a lower clad layer, the manufacturing method including the steps of: forming a metal film pattern on a base substrate; forming the film on the base substrate that includes the metal film pattern; forming a first cross section with a slight angle to an optical path direction of the film by removing a portion of the film on the metal film pattern with ablation processing of an ultraviolet laser; measuring a position of the core layer exposed at the first cross section; and forming a second cross section having a predetermined angle to the first cross section with the laser ablation processing at a position on the metal film pattern apart from the position of the exposed core layer by a predetermined distance.

According to a sixth aspect of the present invention, there is provided a manufacturing method of an optical waveguide path using a film in which upper and lower surfaces of a core layer are multiply coated respectively by an upper clad layer and a lower clad layer, the manufacturing method including the steps of: forming a metal film on a base substrate, adhering the film onto the metal film and removing a desirable portion of the film by an ultraviolet laser ablation processing; removing the metal film under the desirable portion of the film by etching; forming a first cross section at an end portion of a pattern for alignment by the core layer with a slight angle to a direction of the pattern for the alignment; measuring a position of the core layer exposed at the first cross section; and forming a second cross section with a predetermined angle from an optical path direction of the film at a position apart from the position of the exposed core layer by a predetermined distance.

According to a seventh aspect of the present invention, there is provided an optical device part with an optical waveguide path including a film in which upper and lower surfaces of a core layer are multiply coated respectively by an upper clad layer and a lower clad layer, wherein; the film is provided on an optical device chip being a major portion of the optical device part and made to be the specular surface having a slope of approximately 45 degrees on an upper portion of a light-emitting surface or a light-receiving surface of the optical device chip, and a first cross section with a slight angle to an optical path direction is formed at an end portion side of the core layer of the film to expose the core layer.

In the foregoing seventh aspect, a preferable mode is one wherein a hole filled with resin having approximately the same refractive index as that of the core layer is formed from the specular surface having the slope approximately slanting by 45 degrees to the light-emitting surface or the light-receiving surface of the optical device chip.

Also, a preferable mode is one wherein the metal film is formed on the specular surface having the slope approximately slanting by 45 degrees and the resin is coated on the specular surface.

Also, a preferable mode is one, that wherein further includes: a structure in which a spacer is adhered to the optical device chip and the film is formed on the spacer.

Also, a preferable mode is one, that wherein further includes: the structure in which the spacer is formed by a transparent medium and the spacer is protruded from the optical device chip.

Also, a preferable mode is one wherein the first cross section is a plane approximately perpendicular to a plane of the optical device chip.

Also, a preferable mode is one wherein the first cross section is a plane with a predetermined angle non-perpendicular to a plane of the optical device chip.

Also, a preferable mode is one wherein the first cross section with a slight angle to an optical path direction is formed at the end portion side of the core layer of the film to expose the core layer and the second cross section is formed having a predetermined cross angle with the first cross section.

According to an eighth aspect of the present invention, there is provided an optical device part provided with an optical waveguide path including a film with a lower clad layer, a core layer, a thin film upper clad layer, and a side clad layer having approximately a same height as the core layer, wherein the film is provided on an optical device chip being a major portion of the optical device part and made to be a specular surface having a slope of approximately 45 degrees on an upper portion of a light-emitting surface or a light-receiving surface of the optical device chip, and a core layer for alignment used as a pattern for alignment is formed on the film other than the core layer and a first cross section with a slight angle to an optical path direction is formed at an end portion side of the core layer for the alignment to expose the core layer for the alignment, and a second cross section is formed having a predetermined cross angle with the first cross section to expose an end surface of the core layer.

According to a ninth aspect of the present invention, there is provided a manufacturing method of an optical device part with an optical waveguide path, using a film in which upper and lower surfaces of a core layer are multiply coated respectively by an upper clad layer and a lower clad layer, the manufacturing method including the steps of: forming a polymer optical waveguide path on a semiconductor wafer in a process before separating the semiconductor wafer into optical device chips; performing the laser ablation processing to resin of the polymer optical waveguide path with an ultraviolet laser and forming a specular surface with a slope approximately slanting by 45 degrees on an upper portion of a plane being a light-emitting surface or a light-receiving surface of the optical device chip; and forming a cross section with a slight angle to an optical path direction on an other end portion of the polymer optical waveguide path.

In the foregoing ninth aspect, a preferable mode is one wherein the process for forming the polymer optical waveguide path includes the steps of: forming a hole that reaches at least the core layer from the plane being the light-emitting surface or the light-receiving surface on a polymer layer after formation of the polymer layer; and filling the hole with resin of approximately a same refractive index as that of the core layer.

Also, a preferable mode is one wherein the process for forming the specular surface with the slope approximately slanting by 45 degrees includes the steps of: forming a metal film pattern on the upper clad layer of the polymer optical waveguide path; and irradiating the ultraviolet laser in a direction approximately slanting by 45 degrees using a metal film pattern as a mask to perform the laser ablation processing.

According to a tenth aspect of the present invention, there is provided a coupling method of an optical waveguide path that couples a first optical waveguide path including a first film with a lower clad layer, a core layer, a thin film upper clad layer, and a side clad layer having approximately a same height as the core layer, and the second optical waveguide path including a second film with a similar configuration as the first film, wherein the first film is provided on an optical device chip and made to be a specular surface having a slope of approximately 45 degrees on an upper portion of a light-emitting surface or a light-receiving surface of the optical device chip, a first cross section with a slight angle to an optical path direction is formed at an end portion side of each of the core layers to expose the core layer on the first and second films, and a second cross section is formed having a predetermined cross angle with the first cross section, and a height is made to be the same by putting the first cross section and the second cross section of the second optical waveguide path against the first cross section and the second cross section of the first optical waveguide path and by putting surfaces of the first optical waveguide path and the second optical waveguide path against a reference plane common to both the first and the second optical waveguide paths.

According to an eleventh aspect of the present invention, there is provided a coupling method of an optical waveguide path that couples a first optical waveguide path including a first film with a lower clad layer, a core layer, a thin film upper clad layer, and a side clad layer having approximately a same height as the core layer, and a second optical waveguide path including a second film with a similar configuration as the first film, wherein;

the first film is provided on an optical device chip and made to be a specular surface having a slope of approximately 45 degrees on an upper portion of a light-emitting surface or a light-receiving surface of the optical device chip, core layers for alignment used as a pattern for alignment are formed on positions corresponding with each other on the first film and the second film other than the core layer, a first cross section with a slight angle θ to an optical path direction is formed at an end portion side of each of the core layers for the alignment to expose the core layer for the alignment, and a second cross section is formed having a predetermined cross angle with the first cross section to expose an end surface of the core layer, and the first cross section and the second cross section of the second optical waveguide path are put against the first cross section and the second cross section of the first optical waveguide path, and the thin film upper clad layer of the first optical waveguide path and the core layer of the second optical waveguide path are made to contact in a thickness direction.

With the above configurations, since the first optical waveguide path arranged on the optical device chip, which has the first cross section formed such that the first core layer is exposed as the oblique plane with the slight angle at the end portion and the second cross section formed in the approximately vertical direction to the first cross section at a position apart from the first cross section by a predetermined distance, and the second optical waveguide path arranged on a base substrate, which has the first cross section formed such that its core layer is exposed as the oblique plane with the slight angle at the end portion and the second cross section formed in the approximately vertical direction to the first cross section at the position apart from the first cross section by a predetermined distance, are coupled by aligning the first cross sections and the second cross sections, the first optical waveguide path and the second optical waveguide path are easily coupled.

Therefore, an optical waveguide path coupling structure of the present invention can be realized without requiring highly accurate alignment.

BRIEF DESCRIPTION OF THE DRAWINGS

Other objects, features, and advantages of the present invention will become more apparent from the following detailed description when read in conjunction with the accompanying drawings, in which:

FIG. 1 is a plan view showing an optical waveguide path coupling structure according to a first embodiment of the present invention;

FIG. 2 is a side view showing the optical waveguide path coupling structure;

DESCRIPTION OF THE PREFERRED EMBODIMENTS

Best modes for carrying out the present invention will be described in further detail using various embodiments with reference to the accompanying drawings.

First Embodiment

Figure 7A:
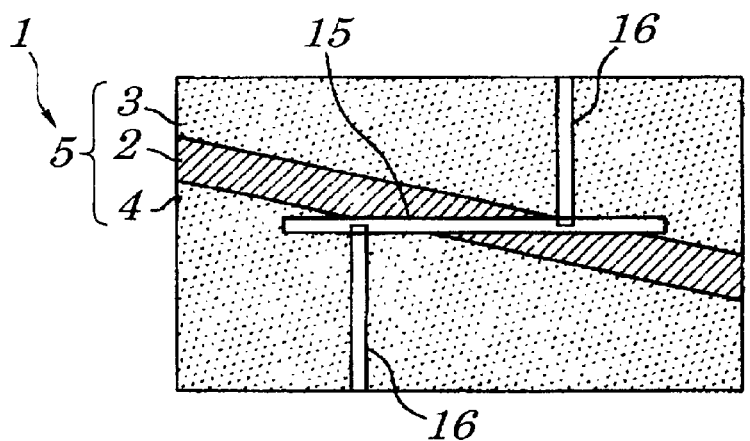
FIGS. 7A and 7B are process views sequentially showing the manufacturing method of the first optical waveguide path being one component of the optical waveguide path coupling structure of the first embodiment.
Figure 7B:
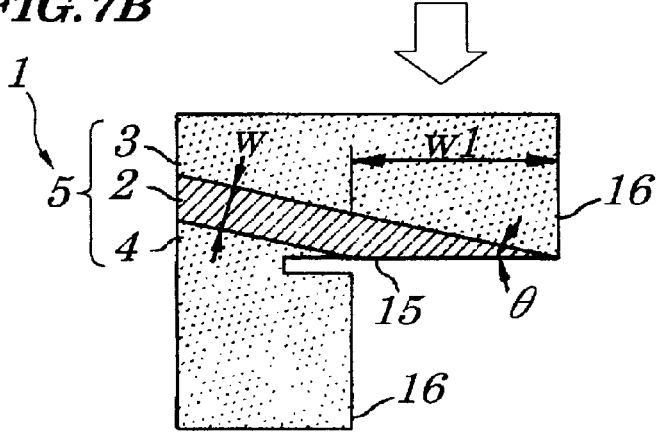
Figure 8A:
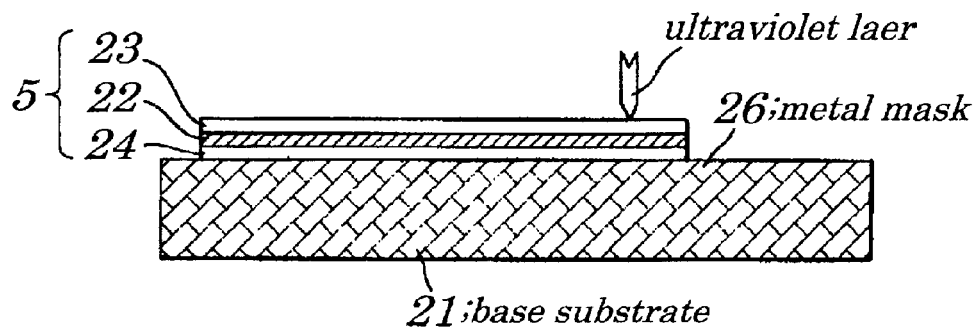
FIGS. 8a and 8B are process views showing a manufacturing method of a second optical waveguide path being another component of the optical waveguide path coupling structure of the first embodiment.
Figure 8B:
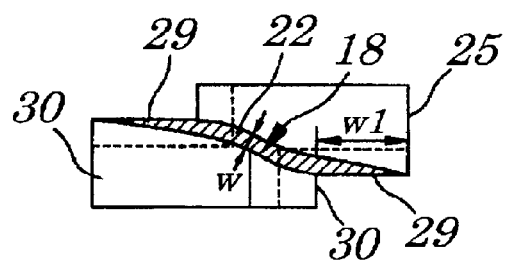
Figure 9:
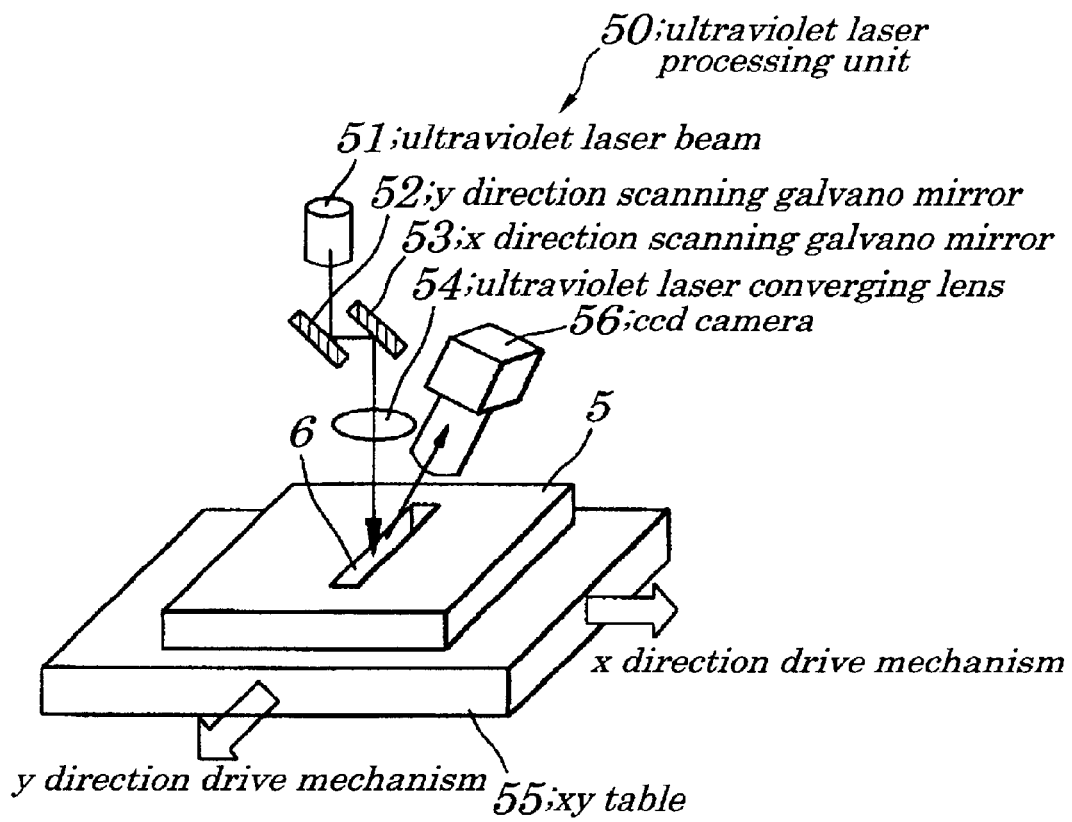
FIG. 9 is a view schematically showing a configuration of an ultraviolet laser processing unit used for manufacturing the optical waveguide path coupling structure of the first embodiment.

FIG. 1 is a plan view showing an optical waveguide path coupling structure 10 according to a first embodiment of the present invention, FIG. 2 is a side view showing the optical waveguide path coupling structure 10, FIG. 3 to FIG. 7 are process views sequentially showing a manufacturing method of a first optical waveguide path 1 being one component of the optical waveguide path coupling structure 10, FIGS. 8A and 8B are process views showing a manufacturing method of a second optical waveguide path being another component of the optical waveguide path coupling structure 10, and FIG. 9 is a view schematically showing a configuration of an ultraviolet laser processing unit 50 used for manufacturing the optical waveguide path coupling structure 10.

In the optical waveguide path coupling structure 10 of the first embodiment, as shown in FIG. 1 and FIG. 2, a first optical waveguide path 1 arranged on an optical device chip 19, which has a first cross section 15 formed such that the core layer 2 is exposed as an oblique plane with a slight angle θ of approximatey 6 degrees, for example, at an end portion and a second cross section 16 formed in an approximately vertical direction to the first cross section 15 at a position apart from the first cross section 15 by a predetermined distance, and a second optical waveguide path 18 arranged on a base substrate 21, which has a first cross section 29 formed such that the core layer 22 is exposed as an oblique plane with a slight angle θ of approximately 6 degrees, for example, at an end portion and a second cross section 30 formed in the approximately vertical direction to the first cross section 29 at a position apart from the first cross section 29 by a predetermined distance, are coupled by aligning the first cross sections (15 and 29) and the second cross sections (16 and 30).

Next, referring to FIG. 3 to FIG. 7, description will be made for the manufacturing method of the first optical waveguide path 1 being one component of the optical waveguide path coupling structure 10 shown sequentially in a process order.

Figure 3A:
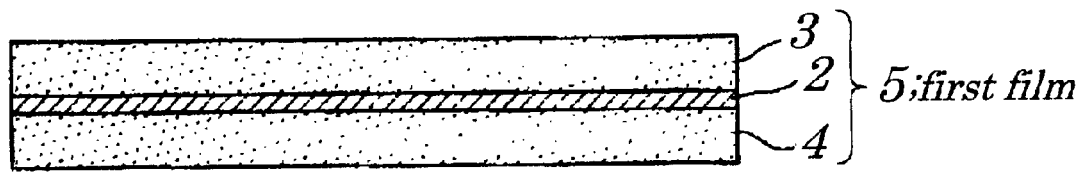
FIGS. 3A to 3D are process views sequentially showing a manufacturing method of a first optical waveguide path being one component of the optical waveguide path coupling structure.

Firstly, as shown in FIG. 3A, a first film 5 is formed where the upper and lower surfaces of the core layer 2 including translucent resin such as polyimide resin, epoxy resin, or siloxane polymer, for example, are multiply coated respectively by an upper clad layer 3 and a lower clad layer 4 including the translucent resin. Herein, in a case of a single-mode, the core layer 2, the upper clad layer 3, and the lower clad layer 4 are formed in a thickness of approximately 10 $\mu$m, approximately 20 $\mu$m, and approximately 50 $\mu$m respectively, and a width of the core layer 2 is approximately 10 $\mu$m. On the other hand, in a case of a multi-mode, the core layer 2, the upper clad layer 3, and the lower clad layer 4 are formed in the thickness of approximately 50 $\mu$m, approximately 40 $\mu$m, and approximately 70 $\mu$m respectively, and the width of the core layer 2 is approximately 50 $\mu$m.

Figure 3B:
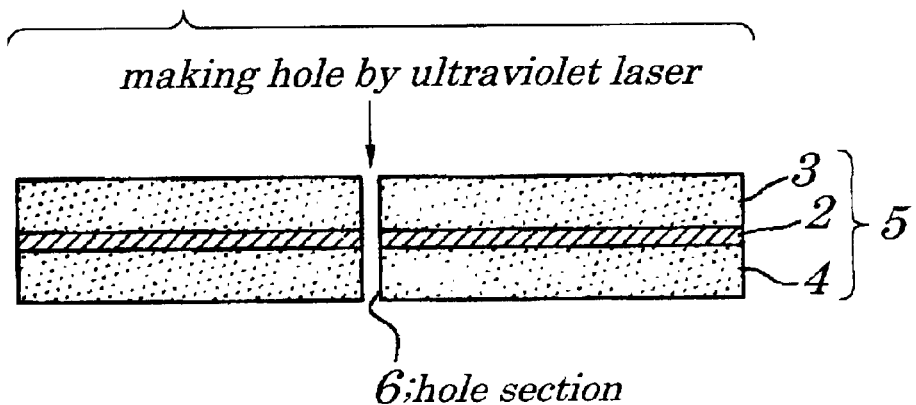

Next, as shown in FIG. 3B, a hole section 6 reaching the lower clad layer 4 from the upper clad layer 3 of the first film 5 is formed by the ultraviolet laser processing unit 50. Herein, a diameter of the hole section 6 is formed in approximately 10 $\mu$m in the case of the single-mode and in approximately 50 $\mu$m in the case of the multi-mode. As described later, the hole section 6 becomes a hole wall when a specular surface 8 is formed at an end portion of the first film 5. The foregoing laser processing of the hole section 6 is performed by irradiating an ultraviolet ray having a wavelength of approximately 266 nm, which is generated by a FHG (a fourth-harmonic YAG laser) for example, to the first film 5 by use of an ultraviolet laser processing unit as shown in FIG. 9. Alternatively, the processing may be performed by irradiating the ultraviolet ray having a wavelength of approximately 248 nm generated from a KrF medium or the ultraviolet ray having a wavelength of approximately 193 nm generated from an ArF medium by utilizing an excimer laser. Note that the hole section 6 may be formed to a depth reaching at least the core layer 2.

As shown in FIG. 9, the foregoing ultraviolet laser processing unit 50 includes: an ultraviolet laser light source 51; a Y direction scanning galvano mirror 52 that scans an ultraviolet ray generated form the ultraviolet laser light source 51 in a Y direction; an X direction scanning galvano mirror 53 that scans the ultraviolet ray in an X direction; an ultraviolet laser converging lens 54 that converges the ultraviolet ray; an XY table 55 that supports the first film 5 being an object to be processed and is driven by an X direction drive mechanism (not shown) and a Y direction drive mechanism (not shown); and a CCD camera 56 that observes a processing portion of the object to be processed.

Figure 3C:
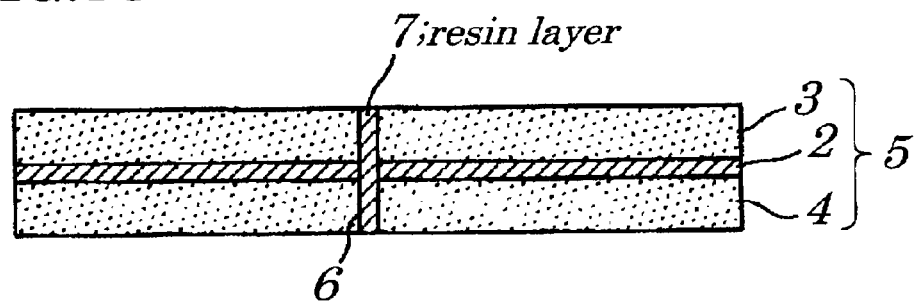

Next, as shown in FIG. 3C, the resin having the same refractive index as that of the core layer 2 is filled in the hole section 6 to be cured, and thus forming a resin layer 7. The resin layer 7 functions as the first optical waveguide path 1 that transmits an optical signal together with the core layer 2.

Figure 3D:
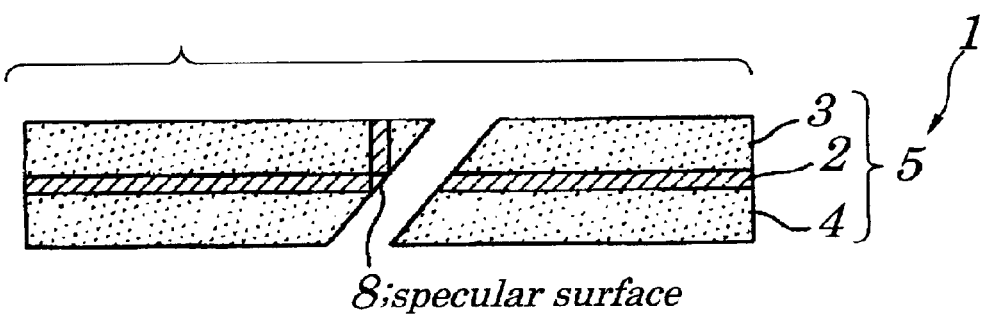

Next, as shown in FIG. 3D, ablation processing is performed using the ultraviolet laser processing unit 50, where the ultraviolet ray having a wavelength of approximately 266 nm is irradiated on the first film 5 by the foregoing YAG laser, for example, by making a ray tilt in a direction of 45 degrees, and the specular surface 8 of approximately 45 degrees is formed at a position including the core layer 2 and the resin layer 7. The specular surface 8 functions to convert the optical path of the light traveled through the core layer 2 into the perpendicular direction so as to direct toward the resin layer 7, or functions to convert the optical path of the light traveled through the resin layer 7 into the perpendicular direction so as to direct toward the core layer 2.

Figure 6A:
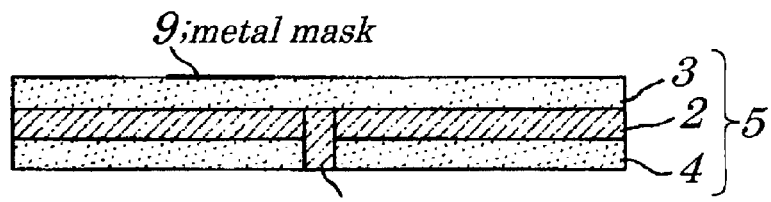
FIGS. 6A and 6B are process views sequentially showing the manufacturing method of the first optical waveguide path being one component of the optical waveguide path coupling structure of the first embodiment.
Figure 6B:
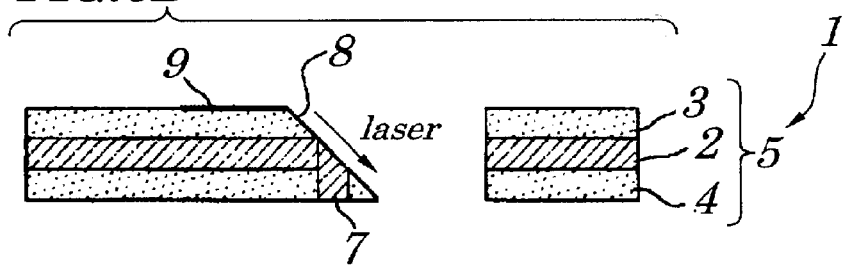

Further, in the case of processing the specular surface 8 using the excimer laser, a non-processing plane is covered in advance by a metal mask 9 such as Al and Cu, for example, as shown in FIG. 6A, because the ultraviolet ray generated by the excimer laser tends to spread easily. The metal mask 9 is formed by a method such as evaporation, plating, or metal leaf transfer. Next, as shown in FIG. 6B, the ablation processing is performed where the ultraviolet ray having a wavelength of approximately 248 nm or approximately 193 nm is irradiated only to a processing plane of the first film 5 by making the ray tilt in the direction of 45 degrees, and the specular surface 8 of approximately 45 degrees is formed at the position including the core layer 2 and the resin layer 7. Alternatively, the specular surface 8 may be formed by processing using a diamond cutter (not shown) instead of the ultraviolet laser processing unit 50.

As described, the first optical waveguide path 1 is manufactured. The first optical waveguide path 1 is further manufactured as the optical device part with the optical waveguide path via the following manufacturing process.

Figure 4:
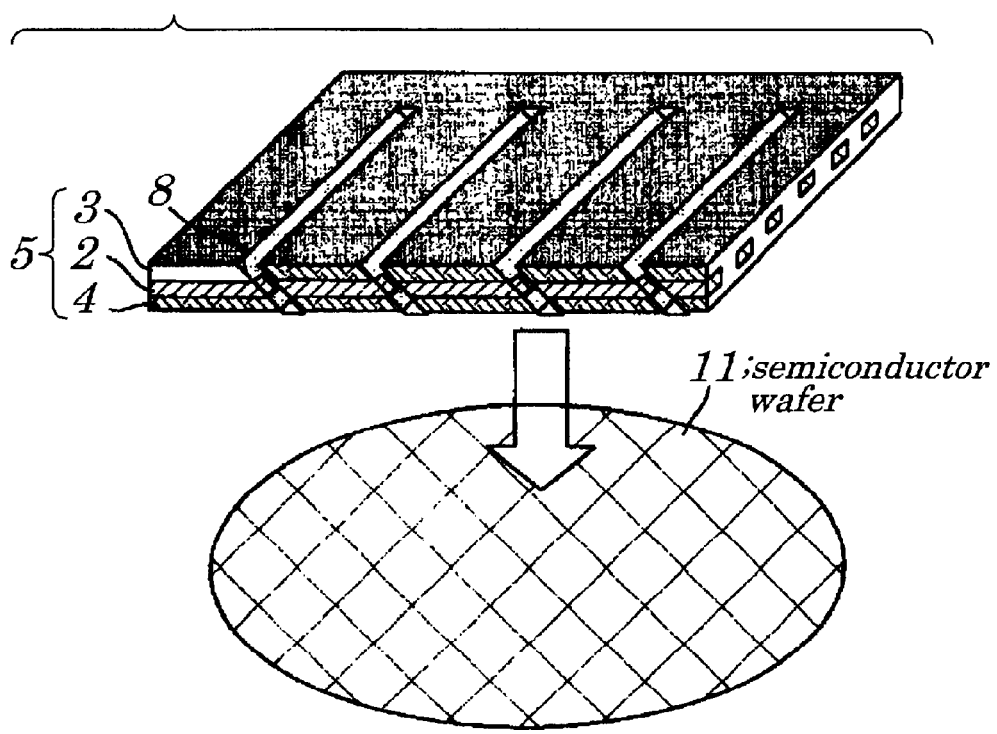
FIG. 4 is a process view sequentially showing the manufacturing method of the first optical waveguide path being one component of the optical waveguide path coupling structure of the first embodiment.
Figure 5:
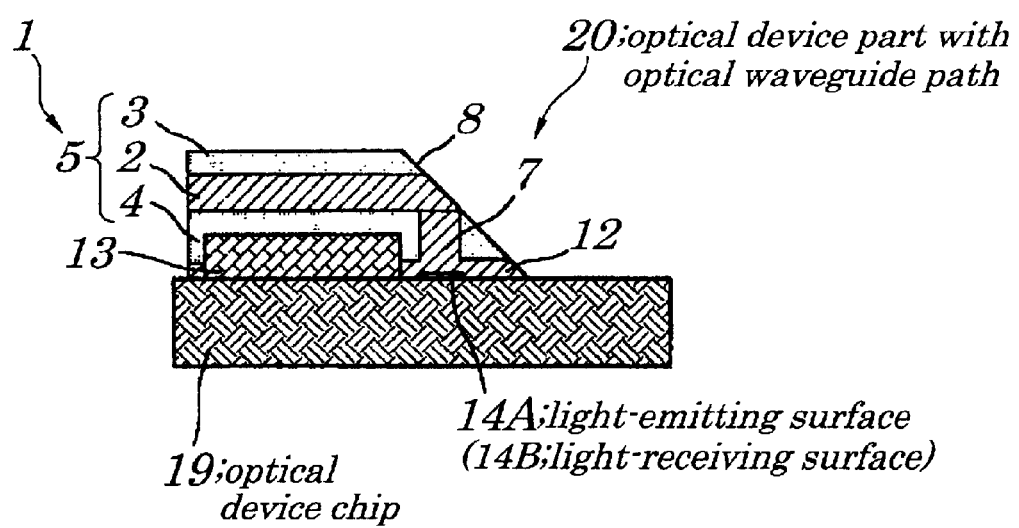
FIG. 5 is a process view sequentially showing the manufacturing method of the first optical waveguide path being one component of the optical waveguide path coupling structure of the first embodiment.

Next, as shown in FIG. 4 and FIG. 5, the first film 5 is adhered to a semiconductor wafer 11 by using an adhesive agent 12 having a same refractive index as that of the core layer 2. The optical device chip 19 such as a planar light-emitting device or a planar light-receiving device (both are not shown) is formed on the semiconductor wafer 11 in advance, and the first film 5 is adhered such that its resin layer 7 is aligned with a light-emitting surface 14A of the planar light-emitting device or a light-receiving surface 14B of the planar light-receiving device as shown in FIG. 5. Thus, the light-emitting surface 14A of the planar light-emitting device or the light-receiving surface 14B of the planar light-receiving device is coupled to one end of the first film 5 serving as the first optical waveguide path 1.

Next, as shown in FIG. 7A, the first cross section 15 is formed at the other end portion of the first film 5 to serve as the first optical waveguide path 1, to which its one end is coupled with the light-emitting surface 14A of the planar light-emitting device or the light-receiving surface 14B of the planar light-receiving device on the semiconductor wafer 11 as described above. Specifically, the first cross section 15 is formed such that a vertical cross section of the core layer 2 of the first film 5 is exposed as an oblique plane with a slight angle θ of approximately 6 degrees to the optical path direction. The first cross section 15 can be easily formed by irradiating the ultraviolet ray generated by the YAG laser or the excimer laser to the plane to be processed while performing alignment by the Y direction scanning galvano mirror 52 and the X direction scanning galvano mirror 53.

With the formation of the foregoing first cross section 15, a width W of the core layer 2 of the first film 5 is exposed as an expanded value W1 by approximately ten times as shown in the following expression.

Specifically, when θ=6° is assigned to Sin θ=W/W1,

Sin 6°=0.104=$W/W1$

∴W1≈9.6W

Therefore, suppose the width W of the core layer 2 is set to approximately 10 µm as described above, the core layer 2 is exposed at the first cross section 15 in an expanded width W1 of approximately 96 µm.

Next, as shown in FIG. 7B, the second cross section 16 is formed in an approximately perpendicular direction to the first cross section 15 of the first film 5. Firstly in forming the second cross section 16, the position of the end portion of the first cross section 15 is detected by the CCD camera 56 (FIG. 9) of the ultraviolet laser processing unit 50 or by laser scanning. Then, a limit point of the position along the first cross section 15 is measured. Next, the second cross section 16 is formed at a position apart by a predetermined distance along the first cross section 15 in an approximately perpendicular direction to the first cross section 15 by a method similar to the forming method of the first cross section 15. The formation position of the second cross section 16 is appropriately selected because a limit point along the first cross section 15 is previously measured. As described above, the first cross section 15 that obliquely exposes the core layer 2 with the slight angle θ at the first film 5 and the second cross section 16, which is formed in the approximately perpendicular direction to the first cross section 15 at the position apart from the first cross section 15 by the predetermined distance, are formed on the first film 5 serving as the first optical waveguide path 1 as shown in FIG. 7B. The first and second cross sections 15 and 16 are used as an alignment reference plane when the first optical waveguide path 1 is put against the second optical waveguide path 18 to complete the optical waveguide path coupling structure 10 as described later.

Next, as shown in FIG. 5, apart of the first film 5 is removed and a spacer 13 is adhered at this position by using the ultraviolet laser processing unit 50. The spacer 13 is used as an alignment reference plane when the first optical waveguide path 1 is put against the second optical waveguide path 18 to complete the optical waveguide path coupling structure 10 as described later. Then, the semiconductor wafer 11 is separated into optical device chips 19 by using the diamond cutter (not shown). Accordingly, an optical device part with the optical waveguide path 20, where the first optical waveguide path 1 is formed on the optical device chip 19, is manufactured.

Next, description will be made for the manufacturing method of the second optical waveguide path 18 being another component of the optical waveguide path coupling structure 10.

Firstly as shown in FIG. 8A, a desired position on the base substrate 21 is covered with a metal mask 26 such as aluminum (Al) and copper (Cu), for example, using the base substrate 21 including the translucent resin. The metal mask 26 is used to prevent an area other than the processing plane from being processed when processing a second film 25 by the ultraviolet laser to form the second optical waveguide path 18. Since a plurality of the optical device chips 19 are arranged on the base substrate 21, the base substrate 21 having a large area when compared to the optical device chip 19.

Next, the second film 25 is formed where the upper and lower surfaces of the core layer 22 including the translucent resin, are coated by an upper clad layer 23 and a lower clad layer 24 respectively including the translucent resin, and the second film 25 is adhered onto the base substrate 21 using the adhesive agent having the same refractive index as that of the lower clad layer 24. Herein, in a case of a single-mode, the core layer 22, the upper clad layer 23 and the lower clad layer 24 are formed in a thickness of approximately 10 $\mu$m, approximately 20 $\mu$m, and approximately 20 $\mu$m respectively, and a width of the core layer 22 is 10 $\mu$m. On the other hand, in a case of a multi-mode, the core layer 22, the upper clad layer 23 and the lower clad layer 24 are formed in the thickness of approximately 50 $\mu$m, approximately 40 $\mu$m, and approximately 40 $\mu$m respectively, and a width of the core layer 22 is 50 $\mu$m.

Next, as shown in FIG. 8B, the first cross section 29 is formed on the end portion of the second film 25 serving as the second optical waveguide path 18 by using the ultraviolet laser processing unit 50. Specifically, the first cross section 29 is formed such that the vertical cross section of the core layer 22 of the second film 25 obliquely exposes with the slight angle θ of approximately 6 degrees to the optical path direction. The first cross section 29 can be easily formed by irradiating the ultraviolet ray generated by the YAG laser or the excimer laser to the plane to be processed while performing alignment by the Y direction scanning galvano mirror 52 and the X direction scanning galvano mirror 53. Accordingly, with the formation of the foregoing first cross section 29, the width W of the core layer 22 of the second film 25 is exposed as the expanded value W1 by approximately ten times due to the same reason as the case of foregoing first film 5.

Next, a second cross section 30 is formed in an approximately perpendicular direction to the first cross section 29 of the second film 25. Firstly in forming the second cross section 30, a position of an end portion of the first cross section 29 is by the CCD camera 56 of the ultraviolet laser processing unit 50 or by laser scanning. Then, a limit point of a position along the first cross section 29 is measured. Next, the second cross section 30 is formed at a position apart by a predetermined distance along the first cross section 29 in the approximately perpendicular direction to the first cross section 29 by a method similar to the forming method of the first cross section 15 in the foregoing first optical waveguide path 1. Formation position of the second cross section 30 is appropriately selected because the limit point along the first cross section 29 is previously measured. As described above, the first cross section 29 that obliquely exposes the core layer 22 with the slight angle θ to an optical path direction and the second cross section 30, which is formed in the approximately perpendicular direction to the first cross section 29, are formed on the second film 25 serving as the second optical waveguide path 18 as shown in FIG. 8B. The first and second cross sections 29 and 30 are used as the alignment reference plane when the first optical waveguide path 1 is put against the second optical waveguide path 18 to complete the optical waveguide path coupling structure 10 as described later. Accordingly, the base substrate 21 having the second film 25 serving as the second optical waveguide path 18 is manufactured.

Next, referring to FIG. 2, description will be made for the manufacturing method of the optical waveguide path coupling structure 10 by using the optical device part with the optical waveguide path 20 and the base substrate 21.

Firstly, as shown in FIG. 2, the optical device part with the optical waveguide path 20 is arranged on the base substrate 21 to make the first optical waveguide path 1 and the second optical waveguide path 18 face with each other, and the both optical waveguide paths 1 and 18 are aligned in the height direction. This alignment is performed by making a surface of the spacer 13 be a common reference plane and putting the second optical waveguide path 18 against the common reference plane. Hereinafter, an alignment method in the height direction will be described.

As described, the thickness of the lower clad layer 4 of the first film 5 serving as the first optical waveguide path 1 is formed in approximately 50 $\mu$m. On the other hand, the thickness of the upper clad layer 23 of the second film 25 serving as the second optical waveguide path 18 is formed in approximately 20 $\mu$m. Therefore, the spacer 13 having the thickness of approximately 30 82 m is used and the upper clad layer 23 of the second film 25 of the base substrate 21 is put against the surface of the spacer 13, and thus the height of the core layer 2 of the first optical waveguide path 1 and the height of the core layer 22 of the second optical waveguide path 18 equal (both height dimensions are 50 $\mu$m above a level of the optical device chip 19). The alignment in the height direction ends accordingly. As described, using the spacer 13 with the thickness corresponding to that of each the first and second of optical waveguide paths 1 and 18 makes it easy to adjust the height of the first optical waveguide path 1 and the second optical waveguide path 18 in order to equal both height dimensions. Moreover, since the thickness of each core layer 2 and 22 is formed in the same dimension of 10 $\mu$m in this embodiment, a uniform optical waveguide path can be secured.

To perform the foregoing alignment in the height direction, specular surface 8 is previously formed on a part of the base substrate 21, which is formed on the second optical waveguide path 18, by the metal film or a like, and the first optical waveguide path 1 may be put against the specular surface 8 using it as the reference plane, other than the method in which the spacer 13 is used as the reference plane.

Next, alignment of the first optical waveguide path 1 and the second optical waveguide path 18 in a horizontal direction is performed.

The alignment is performed by putting together the first cross sections 15 and 29 and the second cross sections (16 and 30) of the first and second optical waveguide paths 1 and 18 that are already formed, as shown in FIG. 1. Actually, it is desirable that opposing cross sections are adhered by the adhesive agent having a same refractive index as that of the core layer 2 (22). In this case, since the first cross sections 15 and 29 are exposed expanding the width of each core layer 2 and 22 by approximately ten times, alignment in the horizontal direction can be performed in the state where positional accuracy is loosened by approximately a single digit. FIG. 1 shows a state where the first cross sections 15 and 29 and the second cross sections 16 and 30 face with each other before being adhered for convenience of explanation.

With the configuration of the first embodiment, the following effects can be obtained:

(1) Since the alignment in the height direction between the first optical waveguide path 1 formed on the optical device chip 19 and the second optical waveguide path 18 formed on the base substrate 21 is performed by putting the second optical waveguide path 18 against the reference plane while the alignment in the horizontal direction is performed in such a manner that the width of each core layer 2 and 22 of the first and second optical waveguide paths 1 and 18 is exposed expanding by approximately ten times and the first cross sections 15 and 29 are put together with each other, the alignment in the height direction can be easily performed and the alignment in the horizontal direction can be performed with loosened positional accuracy.

(2) Although formation of the second optical waveguide path 18 of the base substrate 21 with high accuracy was difficult due to a long dimension comparing to the optical device chip 19, the second optical waveguide path 18 of a predetermined accuracy can be easily manufactured with the loosened processing accuracy.

(3) Since the first optical waveguide path 1 is formed on the semiconductor wafer 11 before separating into the optical device chips 19, the first optical waveguide path 1 can be simultaneously provided to a number of the optical device chips 19, and thus a manufacturing cost of the optical device part with the optical waveguide path 20 can be reduced.

(4) The light traveled through the first optical waveguide path 1 converts its optical path in the perpendicular direction to pass the resin layer 7, an interface of a different refractive index does not exist, and thus a return light due to reflection at the interface can be reduced.

First Modification of the First Embodiment

Figure 10:
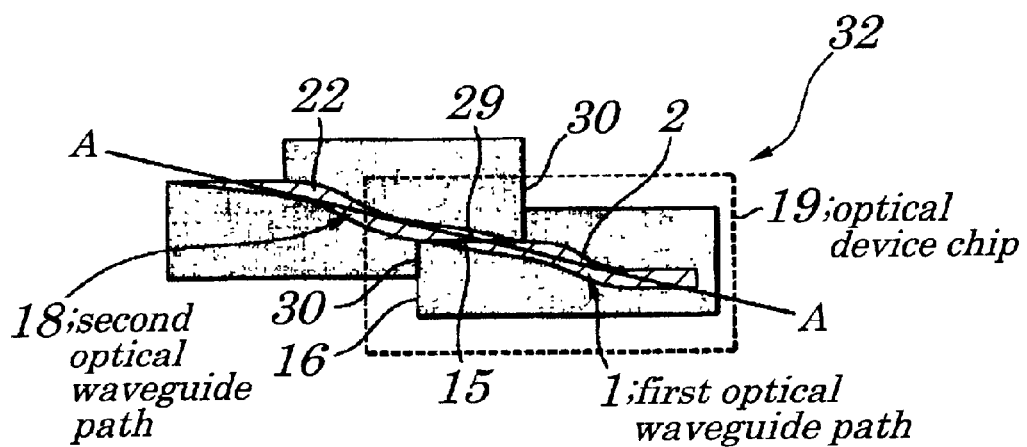
FIG. 10 is a plan view showing an optical waveguide path coupling structure according to a first modification of the first embodiment.
Figure 11:
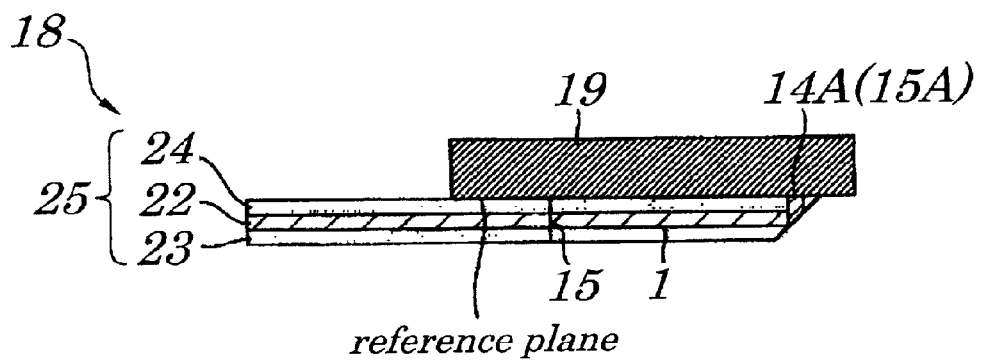
FIG. 11 is a line A—A cross-sectional view of FIG. 10.

FIG. 10 is a plan view showing an optical waveguide path coupling structure 32 according to a first modification of the first embodiment, and FIG. 11 is a line A—A cross sectional view of FIG. 10. Configuration of the optical waveguide path coupling structure of the first modification is different from that of the foregoing first embodiment in that the second optical waveguide path 18 is directly used as it is without forming on the base substrate 21.

In an optical waveguide path coupling structure 32 of this modification, as shown in FIG. 10 and FIG. 11, the second optical waveguide path 18 including the second film 25 is directly used without requiring the base substrate, and put against the first optical waveguide path 1 on the optical device chip 19. In this case, the second optical waveguide path 18 uses a surface of the optical device chip 19 as the reference plane, and is adhered to the first optical waveguide path 1 by the adhesive agent having the same refractive index as that of the core layer 22. Other parts of configuration are similar to the first embodiment. Therefore, in FIG. 10 and FIG. 11, each part corresponding to each of the components shown in FIG. 1 and FIG. 2 is labeled with the same reference numeral, and therefore the description thereof is omitted.

Accordingly, effects similar to the ones described in the first embodiment can be obtained by this modification as well.

In addition, according to the first modiftion, the configuration of the second optical waveguide path 18 can be simplified because the second optical waveguide path 18 is formed without requiring the base substrate.

Secondt Modification of the First Embodiment

Figure 12:
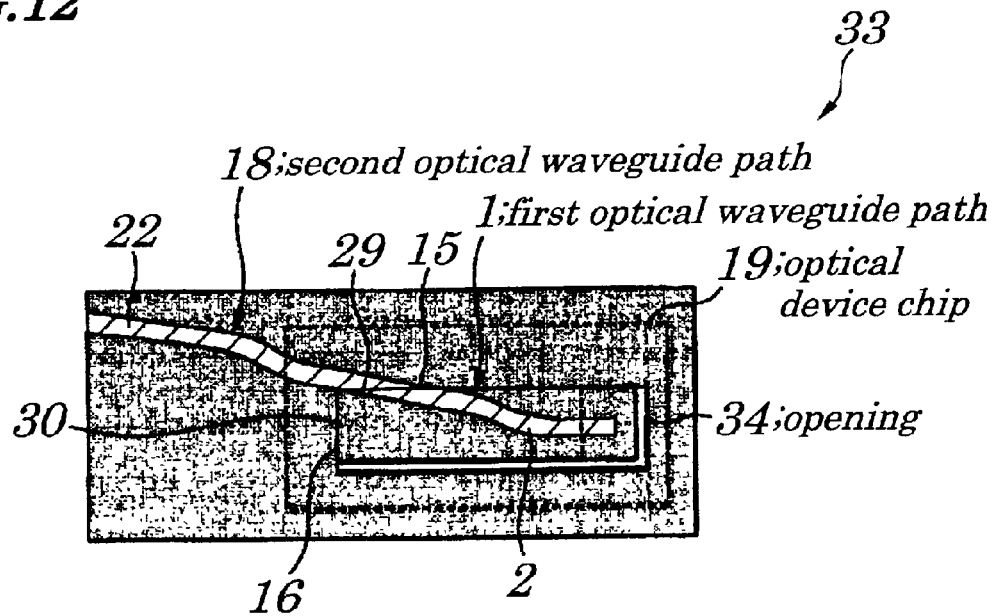
FIG. 12 is a plan view showing an optical waveguide path coupling structure according to a second modification of the first embodiment.

FIG. 12 is the plan view showing an optical waveguide path coupling structure 33 according to a second modification of the first embodiment. Configuration of the optical waveguide path coupling structure 33 of the second modification is different from that of the foregoing first embodiment in that a shape of the second optical waveguide path 18 is formed in a rectangular state.

In the optical waveguide path coupling structure 33 of this modification, as shown in FIG. 12, the shape of the first optical waveguide path 1 is formed in the rectangular state and the first cross section 15 is formed on its one side and the second cross section 16 in approximately perpendicular direction to the first cross section 15 on the other side. On the other hand, an opening 34 of the rectangular state is provided at a position facing the first optical waveguide path 1 of the base substrate 21, the first cross section 29 of the second optical waveguide path 18 is formed on one side of the opening 34, and the second cross section 30 is formed in approximately perpendicular direction to the first cross section 29 on the other side. Then, the first cross sections 15 and 29 and the second cross sections 16 and 30 are aligned.

Accordingly, effects similar to the ones described in the first embodiment can be obtained by this modification as well.

Second Embodiment

Figure 13:
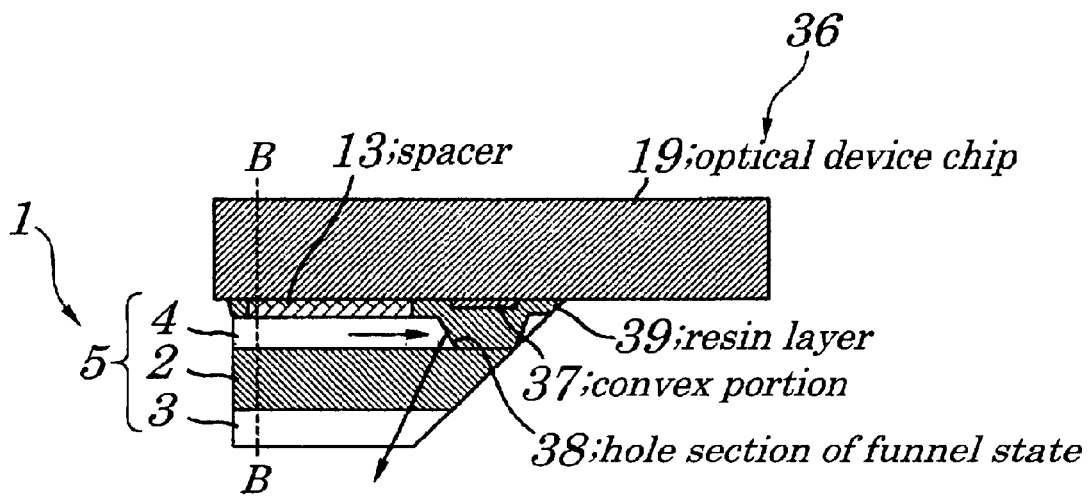
FIG. 13 is a side view showing an optical waveguide path coupling structure of a second embodiment of the present invention.
Figure 14:
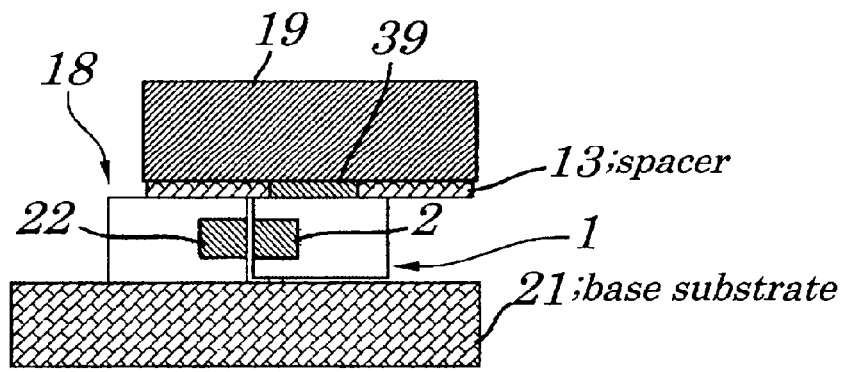
FIG. 14 is a line B—B cross-sectional view of FIG. 13.

FIG. 13 is a side view showing an optical waveguide path coupling structure 36 according to a second embodiment of the present invention, and FIG. 14 is a line B—B cross sectional view of FIG. 13. Configuration of the optical waveguide path coupling structure 36 of the second embodiment is largely different from that of the foregoing first embodiment in that a concave portion is formed on a side of a first optical waveguide path 1 and a convex portion 37 is formed on a side of an optical device chip 19, and then the first optical waveguide path 1 is adhered to the optical device chip 19 utilizing the concave portion and the convex portion 37.

In the optical waveguide path coupling structure 36 of this embodiment, as shown in FIG. 13 and FIG. 14, the convex portion 37 is formed on the optical device chip 19 by a planar light-emitting device, a planar light-receiving device or a like, a hole section of a funnel state 38 being the concave portion corresponding to the convex portion 37 is formed on a lower clad layer 4 (side of optical device chip 19) of the first optical waveguide path 1, and thus the first optical waveguide path 1 is adhered to the optical device chip 19 via a resin layer 39 by aligning the convex portion 37 with the hole section of the funnel state 38. Further, a spacer 13 is provided on the optical device chip 19 in advance, and the first optical waveguide path 1 is adhered to the optical device chip 19 via the spacer 13.

Next, the manufacturing method of the optical waveguide path coupling structure 36 will be described.

Figure 15:
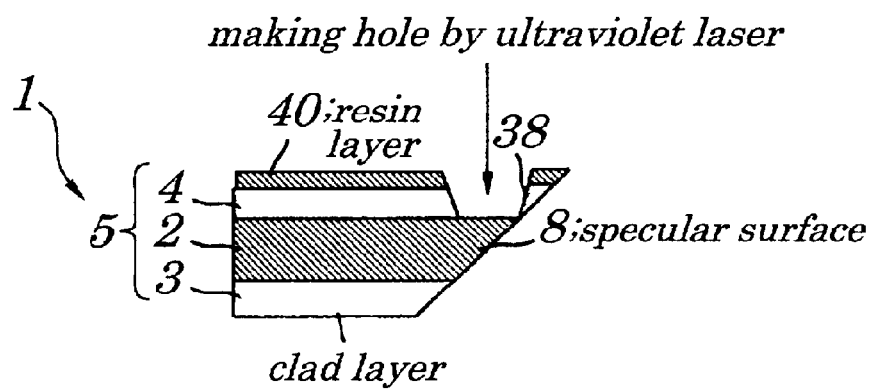
FIG. 15 is a cross-sectional view showing a manufacturing method of the optical waveguide path coupling structure of the second embodiment.

Firstly as shown in FIG. 15, a first film 5 is formed where upper and lower surfaces of a core layer 2 are multiply coated respectively by an upper clad layer 3 and the lower clad layer 4, whereby the first optical waveguide path 1 is formed. Next, as described later, a resin layer 40 having a same refractive index as the lower clad layer 4 is coated on the lower clad layer 4 other than the area where the spacer 13 is put and resin is then half-cured. Then, a specular surface 8 of approximately 45 degrees is formed on an end portion of the first film 5 by using an ultraviolet laser processing unit 50 (FIG. 9) or a diamond cutter. And then, the hole section of the funnel state 38 reaching the lower clad layer 4 from the resin layer 40 is formed by ablation processing with an ultraviolet laser aligning with the specular surface 8.

Figure 16:
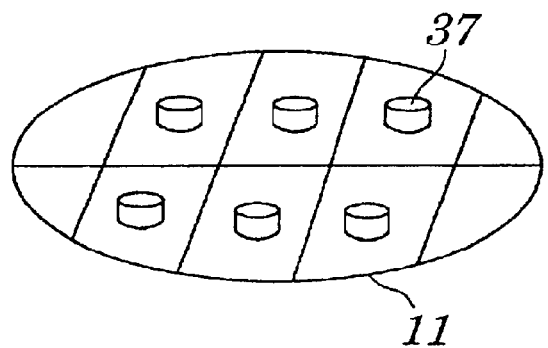
FIG. 16 is a view schematically showing the manufacturing method of the optical waveguide path coupling structure of the second embodiment.

Next, as shown in FIG. 16, a semiconductor wafer 11 is prepared on which the optical device chips 19 such as a planar light-emitting device, a planar light-receiving device or a like are previously formed, and the spacer 13 (FIG. 13) is adhered to a surface other than the optical device chips 19. The convex portions 37 due to the planar light-emitting device, the planar light-receiving device or a like are on the surface of the semiconductor wafer 11.

Next, the first film 5 serving as the first optical waveguide path 1 is adhered to the surface of the semiconductor wafer 11. In performing the adhesion, after the resin layer 39 having the same refractive index as the core layer 2 is filled in the hole section of the funnel state 38, the convex portion 37 of the semiconductor wafer 11 is inserted into the hole section of the funnel state 38 in an aligning manner, and the first film 5 is put against the spacer 13 on the surface of the semiconductor wafer 11. Then, pressurization/heating is applied to melt the resin layer 39 and the half-cured resin layer 40 formed in advance, and the first film 5 is adhered to the surface of the semiconductor wafer 11.

Hereinafter, process similar to the first embodiment is taken to couple the first optical waveguide path 1 and the second optical waveguide path 18, and the optical waveguide path coupling structure 36 is thus completed.

Next, operation of the optical waveguide path coupling structure 36 of this embodiment will be described. Because of formation of the hole section of the funnel state 38 on the first film 5, reflection light at the interface between the resin layer 39 and the lower clad layer 4 is reflected in a direction of an angle 2θ0 (θ0 is an angle at which a wall of the hole section of the funnel state 38 is to the perpendicular) from the horizontal direction when an evanescent light, which is the light passing through the core layer 2 exuded into the upper and lower clad layers 3 and 4, runs up against the resin layer 39 (functions as the core layer) of the hole section of the funnel state 38. At this point, supposing that a refractive index of the resin layer 39 is 1.535 and a refractive index of the lower clad layer 4 is 1.530, for example, a difference between them is 0.005, and thus a critical angle of a total reflection at an interface is approximately 85.4 degrees. Specifically, the light slanted at approximately 4.6 degrees or less from the optical path of the core layer 2 is totally reflected at the interface.

Therefore, in the case where the angle θ0 has a tilt of approximately 4.6 degrees or more, the reflection light by the resin layer 39 is totally reflected to a direction of an angle of approximately 4.6 degrees or more from the horizontal direction with regard to all total reflection light having an angle of deviation of approximately 4.6 degrees or less from an optical path direction. Since this is the angle beyond a limit of the total reflection, the reflection light is not totally reflected at the interface but emitted outside the optical waveguide path 1, and thus the light does not go back in the optical path. Generally, supposing that the refractive index of the core layer 2 is n1 and the refractive index of the upper and lower clad layers 3 and 4 is n0 (<n1), the angle θ0 to emit the reflection light at the wall of the resin layer 39 of the hole section of the funnel state 38 outside the optical waveguide path 1 may be a value shown by the following expression or greater:

$$\theta 0 = \arccos (n0/n1)$$

Furthermore, since a Brewster angle at the interface is 45 degrees when the refractive index of the both layers 2 and 3 (or 4) forming the interface is approximately the same, a polarization of a field part perpendicular to the surface of the first film 5 is not reflected at the interface when the wall of the hole section of the funnel state 38 forms 45 degrees from the surface of the first film 5.

With the configurations of the second embodiment, the following effects can be obtained in addition to the effects of the first embodiment.

(1) When the evanescent light exuded into the upper and lower clad layers 3, 4 around the core layer 2 is reflected at the interface between the resin layer 39 serving as a perpendicular core layer and the lower clad layer 4, the reflection light is reflected in the direction that the light does not go back in the optical path. Accordingly, the light going back in the optical path can be reduced.

(2) Since the specular surface 8 of approximately 45 degrees is formed before formation of the hole section of the funnel state 38, the alignment can be performed to the core layer 2 exposed at the specular surface 8 when forming the hole section 38 of the funnel state, and thus the formation can be performed in high accuracy.

(3) Since the spacer 13 and the film 5 are put against each other without sandwiching a medium, a height of the film 5 and another film can be easily made equal using a surface of the spacer 13 as the reference plane.

Third Embodiment

FIG. 17 and FIG. 18 are the process views sequentially showing the manufacturing method of the optical device part with the optical waveguide path according to a third embodiment of the present invention. Description will be made for the manufacturing method of the optical device part with the optical waveguide path as follows.

Figure 17A:
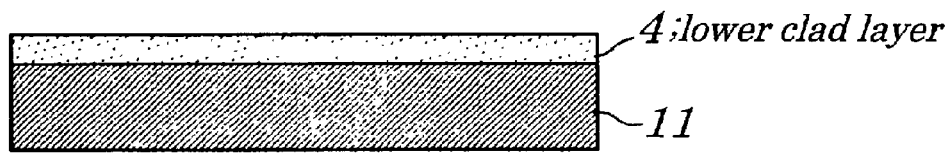
FIGS. 17A to D are process views sequentially showing a manufacturing method of an optical device part with an optical waveguide path according to a third embodiment of the present invention.

Firstly as shown in FIG. 17(a), the semiconductor wafer 11 is prepared on which the optical device chips such as the planar light-emitting device, the planar light-receiving device or the like are previously formed, and the translucent resin is coated on the entire surface by a spin coat method and cured to form the lower clad layer 4.

Figure 19:
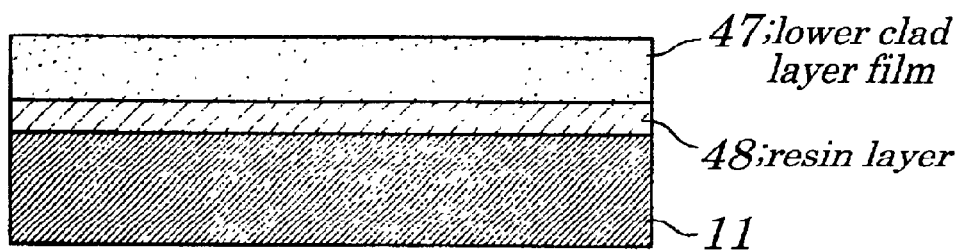
FIG. 19 is a process view sequentially showing the manufacturing method of the optical device part with the optical waveguide path of the third embodiment.

As the forming method of the lower clad layer 4, a film is used in which a resin film 47 for the lower clad layer is coated to a resin layer having the same refractive index as the resin layer 47, pressurization/heating is applied to melt the resin layer 48, and the film may adhered to the surface of the semiconductor wafer 11, as shown in FIG. 19.

Figure 17B:
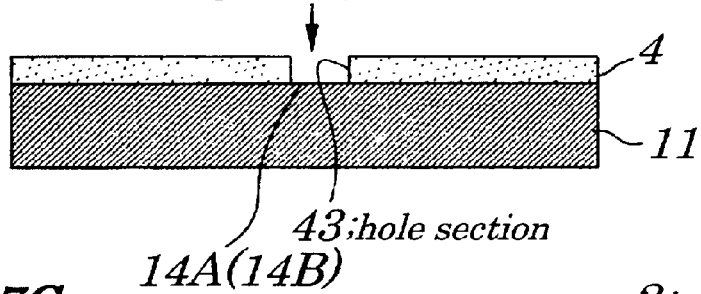

Next, as shown in FIG. 17(b), a hole section 43 is formed at the lower clad layer 4 on a light-emitting surface 14A or a light-receiving surface 14B of the optical device chip of the semiconductor wafer 11 by an ultraviolet laser processing unit 50.

Figure 17C:
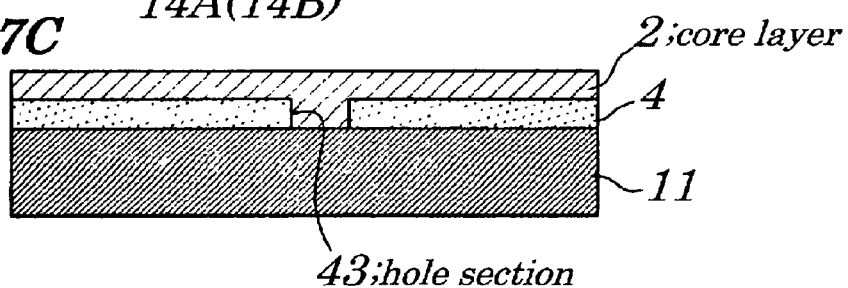
Figure 17D:
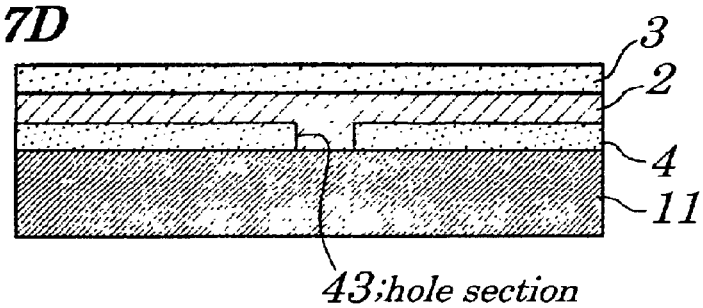

Next, as shown in FIG. 17C, ultraviolet curing resin is coated on the entire surface by the spin coat method. Then, an ultraviolet ray is irradiated on only a desired area after placing an exposure mask on the ultraviolet curing resin, and the ultraviolet curing resin is developed to form a core layer 2. Furthermore, as shown in FIG. 17D, the translucent resin is cured after coating it on an entire surface by a spin coat method, and an upper clad layer 3 is formed.

Figure 18E:
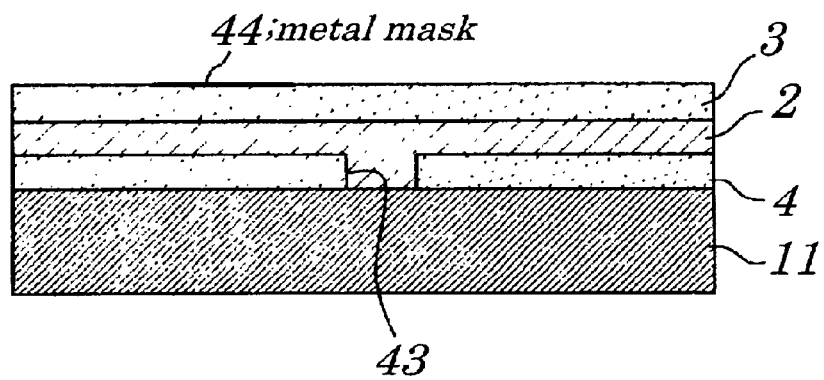
FIGS. 18E to G are process views sequentially showing the manufacturing method of the optical device part with the optical waveguide path of the third embodiment.
Figure 18F:
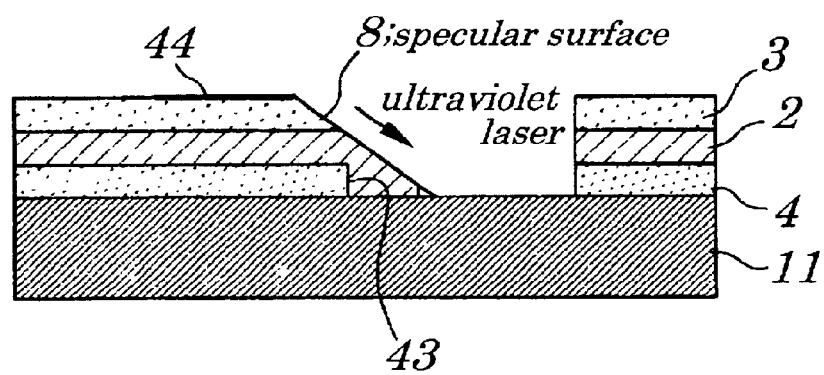

Next, as shown in FIG. 18E, a non-processing plane of the upper clad layer 3 is covered by a metal mask 44 such as Al and Cu, for example. The metal mask 44 is formed by a lift off method, for example. Then, as shown in FIG. 18F, the ultraviolet laser is irradiated tilting in a direction slanting by 45 degrees by using the metal mask 44, and a specular surface 8 of approximately 45 degrees is formed at a position including the core layer 2. Alternatively, the specular surface 8 maybe formed by performing ablation processing by using the ultraviolet laser without using the metal mask 44.

Figure 18G:
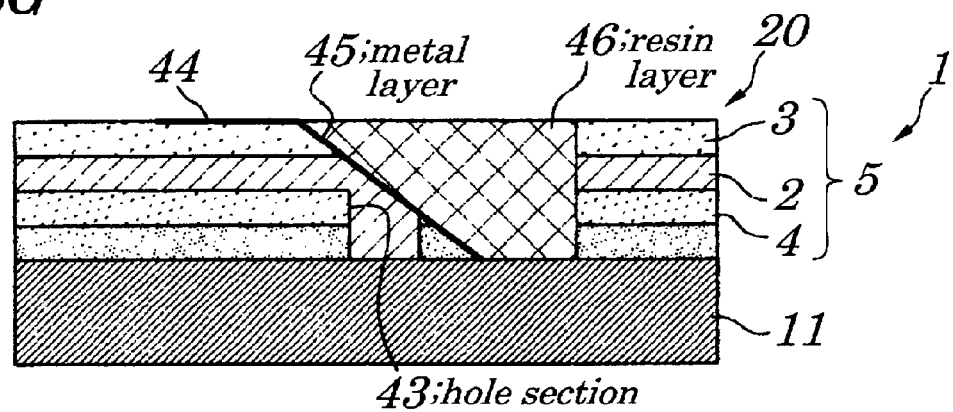

Next, as shown in FIG. 18G, a metal layer 45 such as Al is formed by evaporation to cover the specular surface 8. Then, a resin layer 46 is filled in the hole section 43 to protect the specular surface 8 and a surface of the optical device chip 19. Accordingly, an optical device chip with the optical waveguide path 20 is formed where a first optical waveguide path 1 is formed on the optical device chip 19.

Hereinafter, process similar to the first embodiment is taken to couple the first optical waveguide path 1 and the second optical waveguide path 18, and a optical waveguide path coupling structure is thus completed.

With the configuration of the third embodiment, the following effects can be obtained in addition to the effects of the first embodiment.

The hole section 43 and the specular surface 8 can be formed with high accuracy, because the resin is sequentially coated on the semiconductor wafer 11 by the spin coat method to form the first optical waveguide path 1, the hole section 43 is formed aligning with the light-emitting surface 14A or the light-receiving surface 14B of the optical device chip 19, and the specular surface 8 of approximately 45 degrees is formed at the position including the core layer 2.

Fourth Embodiment

FIG. 20 and FIG. 21 are process views sequentially showing a manufacturing method of an optical device part with an optical waveguide path according to a fourth embodiment of the present invention. Description will be made for the manufacturing method of the optical device part with the optical waveguide path as follows.

Figure 20A:
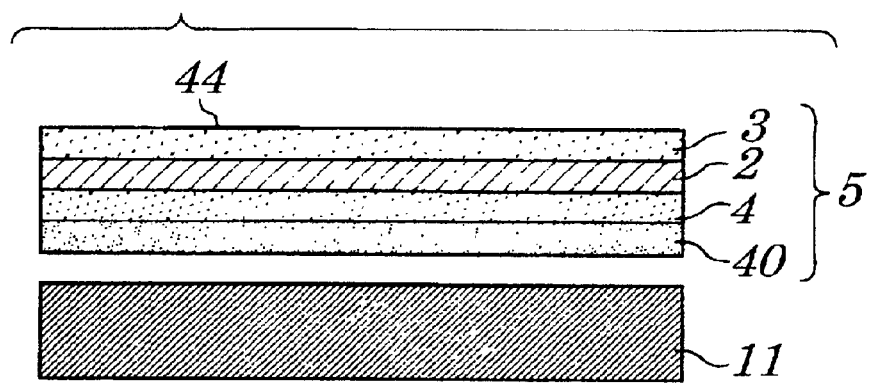
FIGS. 20A and B are process views sequentially showing a manufacturing method of an optical device part with an optical waveguide path of a fourth embodiment of the present invention.

Firstly as shown in FIG. 20A, a first film 5 is formed where upper and lower surfaces of a core layer 2 are multiply coated respectively by an upper clad layer 3 and a lower clad layer 4, a non-processing plane of the upper clad layer 3 is covered by a metal mask 44 such as Al or Cu, and a resin layer 40 having a same refractive index as that of the lower clad layer 4 is coated on the lower clad layer 4 and half-cured. Further, a semiconductor wafer 11 is prepared on which the optical device chips 19 such as a light-emitting surface 14A and a light-receiving surface 14B are previously formed.

Figure 20B:
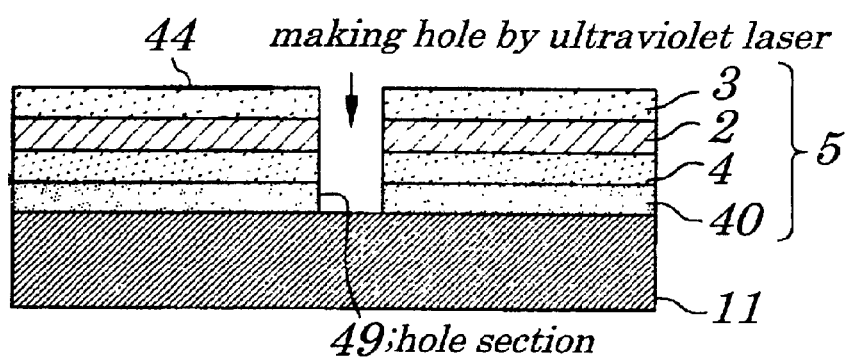
Figure 21C:
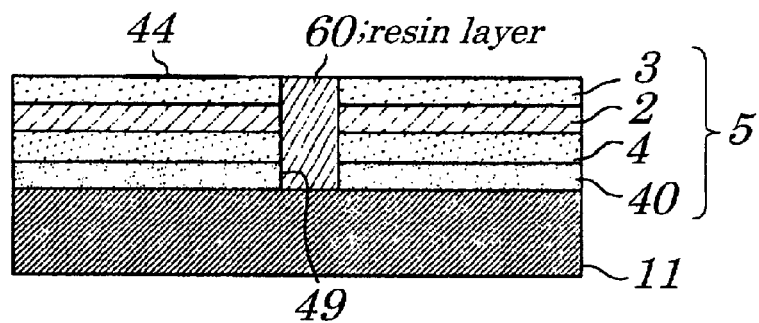
FIGS. 21C to E are process views sequentially showing the manufacturing method of the optical device part with the optical waveguide path of the fourth embodiment.

Next, as shown in FIG. 20B, the core layer 2 is aligned with the light-emitting surface 14A or the light-receiving surface 14B of the optical device chip 19, pressurization/heating is applied to melt the resin layer 40 and the first film 5 is adhered to the surface of the semiconductor wafer 11. Then, a hole section 49 reaching the resin layer 40 is formed on an upper portion of the light-emitting surface 14A or the light-receiving surface 14B of the optical device chip 19 of the semiconductor wafer 11 by the ultraviolet laser processing unit 50. Further, as shown in FIG. 21C, a resin layer 60 having a same refractive index as that of the core layer 2 is filled in the hole section 49.

Figure 21D:
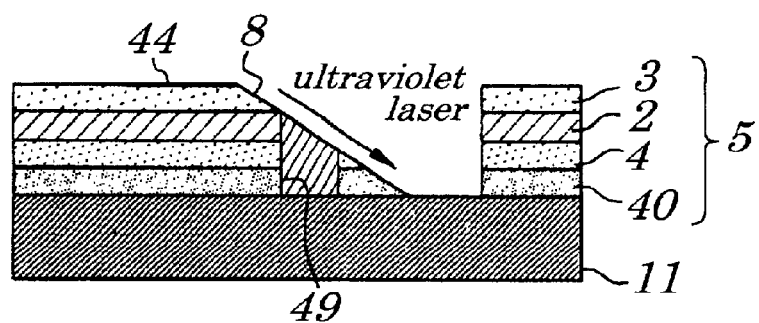

Next, as shown in FIG. 21D, the ultraviolet laser is irradiated tilting in a direction slanting by 45 degrees by using the metal mask 44, and a specular surface 8 of approximately 45 degrees is formed at a position including the core layer 2. Alternatively, the specular surface 8 may be formed performing ablation processing by the ultraviolet laser without using the metal mask 44.

Figure 21E:
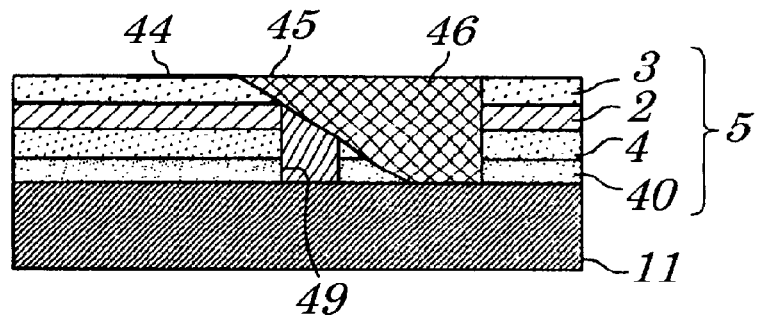

Next, as shown in FIG. 21E, a metal layer 45 such as Al is formed by evaporation to cover the specular surface 8. Then, a resin layer 46 is filled in the hole section 49 to protect the specular surface 8 and the surface of the optical device chip 19. Accordingly, an optical device chip with the optical waveguide path 20 is formed where a first optical waveguide path 1 is formed on the optical device chip 19.

Hereinafter, process similar to the first embodiment is taken to couple the first optical waveguide path 1 and a second optical waveguide path 18, and an optical waveguide path coupling structure 10 is thus completed.

With the configuration of the fourth embodiment, the following effects can be obtained in addition to effects of the first embodiment.

Since the first optical waveguide path 1 can be formed by adhering the resin layer 40 to the semiconductor wafer 11 using the first film 5 on which the resin layer 40 is coated, the first optical waveguide path 1 can be formed in a process independent of the manufacturing process of the semiconductor wafer 11, and thus a level of freedom in the manufacturing method of the first optical waveguide path 1 improves to reduce manufacturing costs.

Fifth Embodiment

Figure 22:
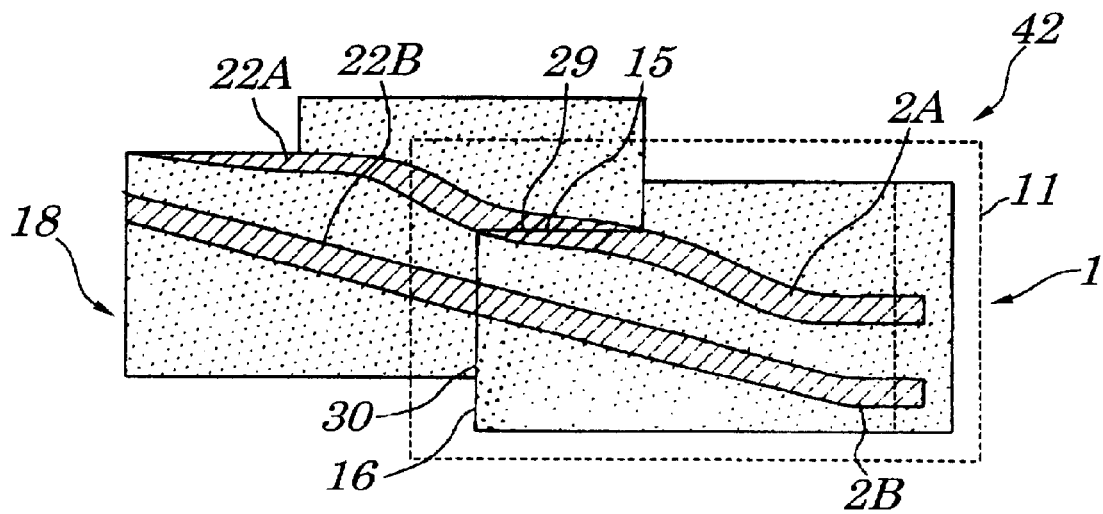
FIG. 22 is a plan view showing an optical waveguide path coupling structure of a fifth embodiment of the present invention.

FIG. 22 is the plan view showing an optical waveguide path coupling structure 42 according to a fifth embodiment of the present invention. A configuration of the optical waveguide path coupling structure 42 of the fifth embodiment is largely different from that of the foregoing first embodiment in that first and second optical waveguide paths 1, 18 are integrally coupled using the first optical waveguide path 1 and the second optical waveguide path 18 in which a plurality of core layers 2A, 2B and 22A, 22B are multiply formed respectively.

In an optical waveguide path coupling structure 42 in the embodiment, the first optical waveguide path 1 and the second optical waveguide path 18 are used, in which approximately parallel two core layers 2A, 2B and approximately parallel two core layers 22A, 22B are formed respectively, the first optical waveguide path 1 has a first cross section 15 formed such that the core layer 2A is obliquely exposed with a slight angle θ of approximately 6 degrees, for example, and a second cross section 16 formed in an approximately vertical direction to the first cross section 15 at a position apart from the first cross section 15 by a predetermined distance, and the second optical waveguide path 18 has a first cross section 29 formed such that the core layer 22A is obliquely exposed with the slight angle θ of approximately 6 degrees, for example, and a second cross section 30 formed in an approximately vertical direction to the first cross section 29 at a position apart from the first cross section 29 by a predetermined distance such that the core layer 22B is exposed, and the first and second optical waveguide paths 1, 18 are integrally coupled by aligning the first cross sections 15, 29 and the second cross sections 16, 30.

Next, the manufacturing method of the optical waveguide path coupling structure 42 will be described. Firstly, the first optical waveguide path 1 is prepared where approximately parallel core layers 2A, 2B are formed on an optical device chip 19, and the second optical waveguide path 18 is prepared where approximately parallel core layers 22A, 22B are formed on a base substrate 21, if necessary. Then, the first cross section 15 is formed on the first optical waveguide path 1 such that the core layer 2A is obliquely exposed with the slight angle θ of approximately 6 degrees, for example. And then, the second cross section 16 is formed such that the core layer 2B is exposed in the approximately vertical direction to the first cross section 15 at the position apart from the first cross section 15 by a predetermined distance.

In the same manner, the first cross section 29 is formed on the second optical waveguide path 18 such that the core layer 22A is obliquely exposed with the slight angle θ of approximately 6 degrees, for example. And then, the second cross section 30 is formed such that the core layer 22B is exposed in the approximately vertical direction to the first cross section 29 at the position apart from the first cross section 29 by a predetermined distance.

Next, with the use of the first optical waveguide path 1 and the second optical waveguide path 18, first cross sections 15, 29 and the second cross sections 16, 30 are put together with each other for alignment, and the optical waveguide path coupling structure 42 is completed.

In the first and second optical waveguide paths 1, 18, a dummy layer that is not used in an actual optical transmission is used as one core layer, the core layer 2B, 22B for example, out of the two sets of core layers 2A, 2B, or 22A, 22B, and it may be used only as a reference for alignment to couple the first and second optical waveguide paths 1, 18.

With the configuration of the fifth embodiment, the following effects can be obtained in addition to the effects of the first embodiment.

With the use of the first and second optical waveguide paths 1, 18 in which a plurality of the core layers 2A, 2B and 22A, 22B are formed, the alignment is performed by putting together the first cross sections 15, 29 and the second cross sections 16, 30, and thus the alignment can be performed simultaneously in high accuracy.

Sixth Embodiment

Figure 23:
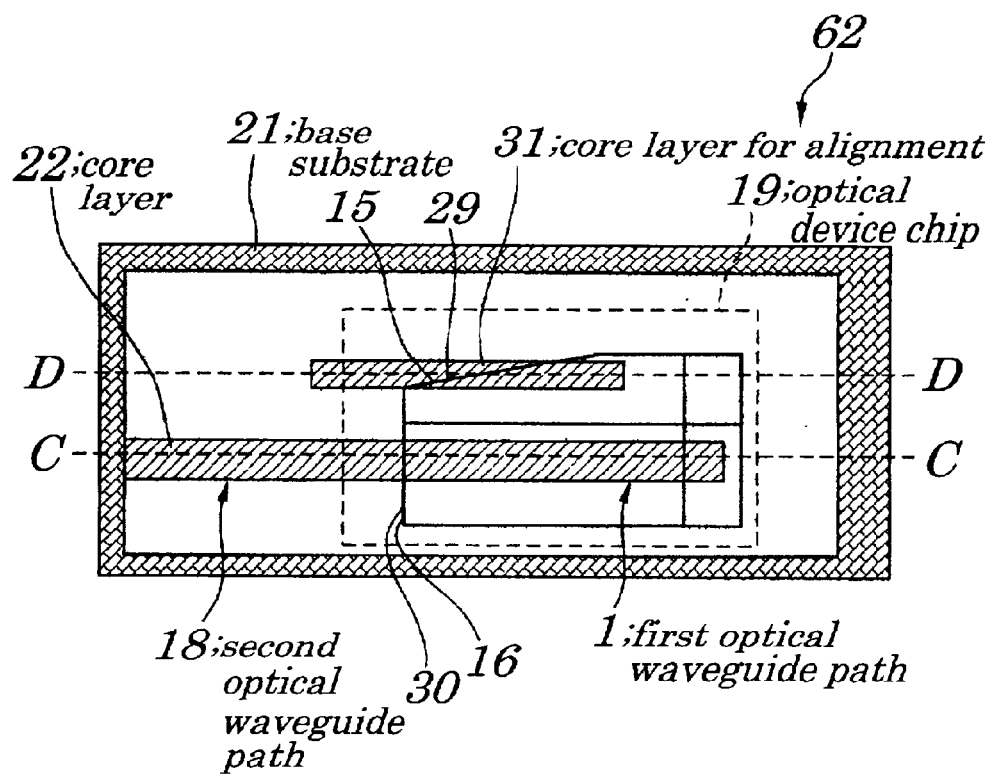
FIG. 23 is a plan view showing the optical waveguide path coupling structure of a sixth embodiment of the present invention.
Figure 24:
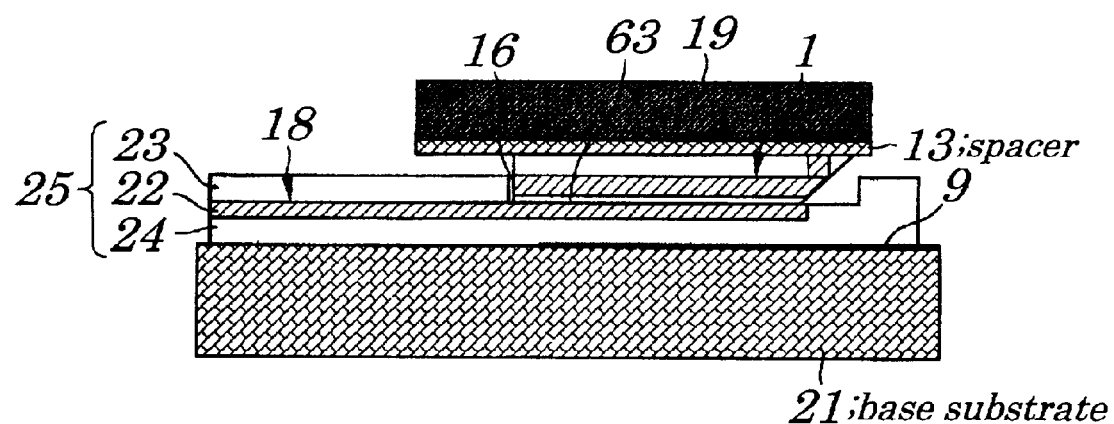
FIG. 24 is a line C—C cross-sectional view of FIG. 23.
Figure 25:
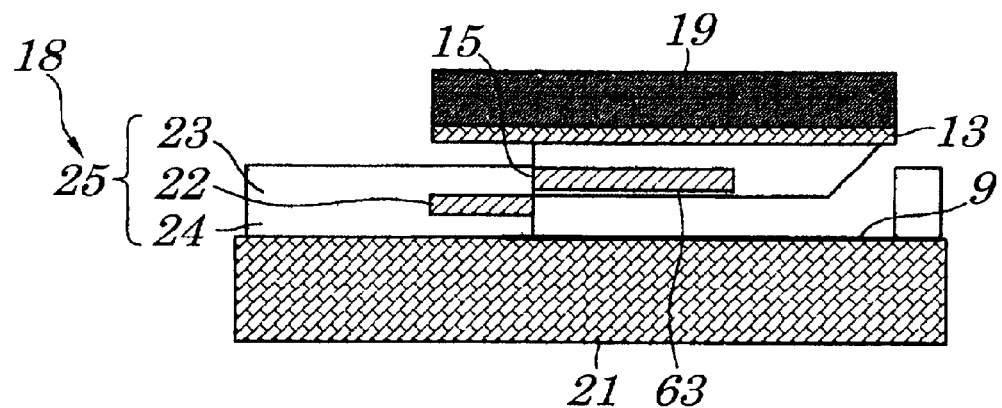
FIG. 25 is a line D—D cross-sectional view of FIG. 23.
Figure 26A:
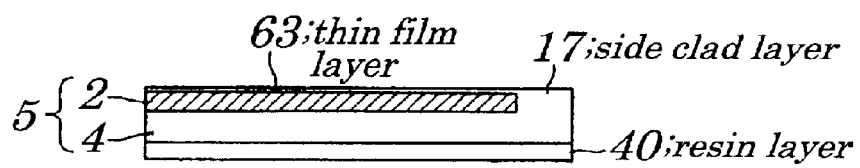
FIGS. 26A to D are process views sequentially showing a manufacturing method of the optical waveguide path coupling structure of the sixth embodiment.
Figure 26B:
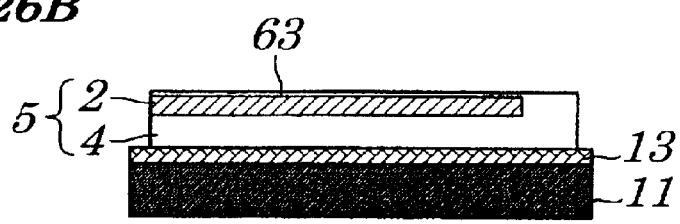
Figure 26C:
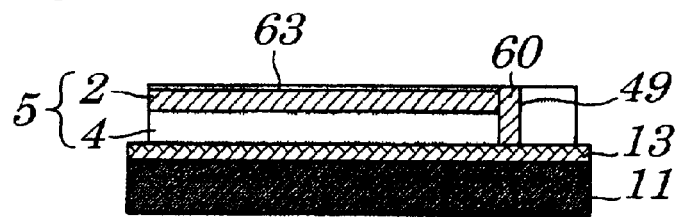
Figure 26D:
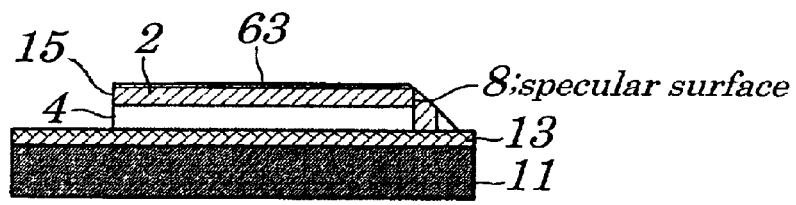
Figure 27:
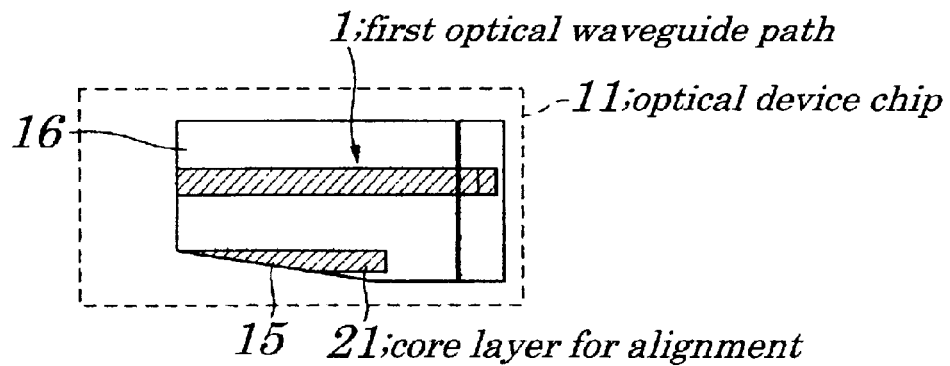
FIG. 27 is a process view sequentially showing the manufacturing method of the optical waveguide path coupling structure of the sixth embodiment.
Figure 28A:
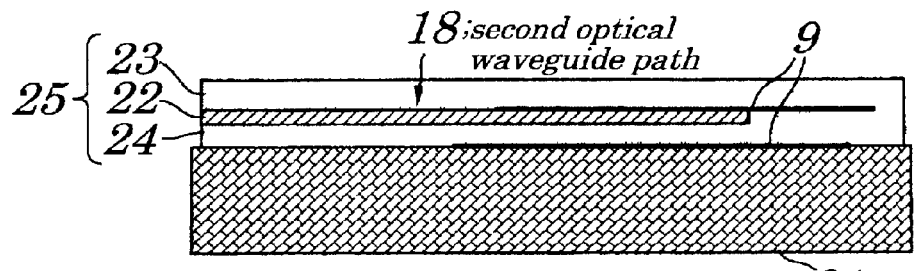
FIGS. 28A to C are process views sequentially showing the manufacturing method of the optical waveguide path coupling structure of the sixth embodiment.
Figure 28B:
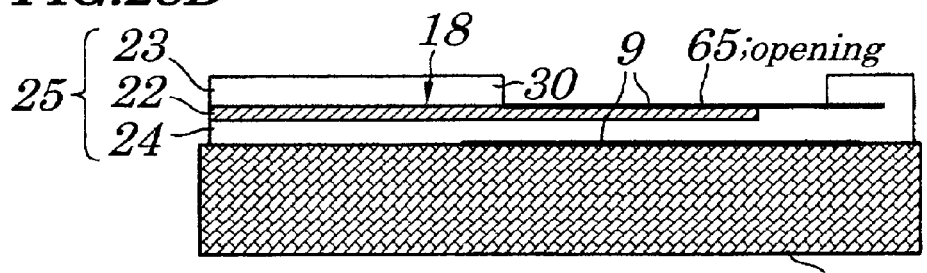
Figure 28C:
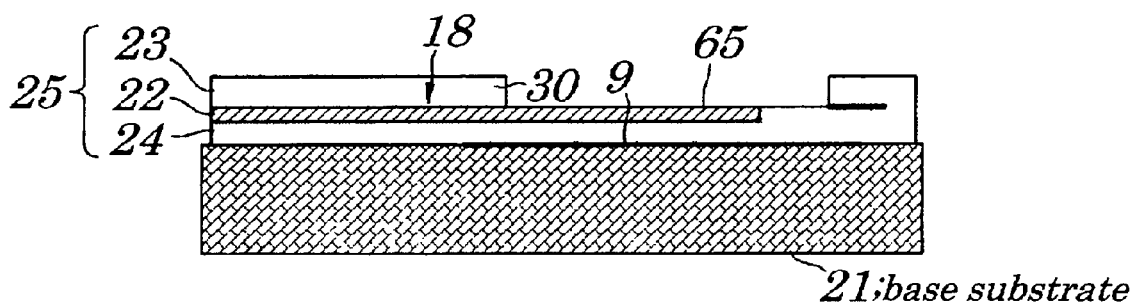
Figure 29:
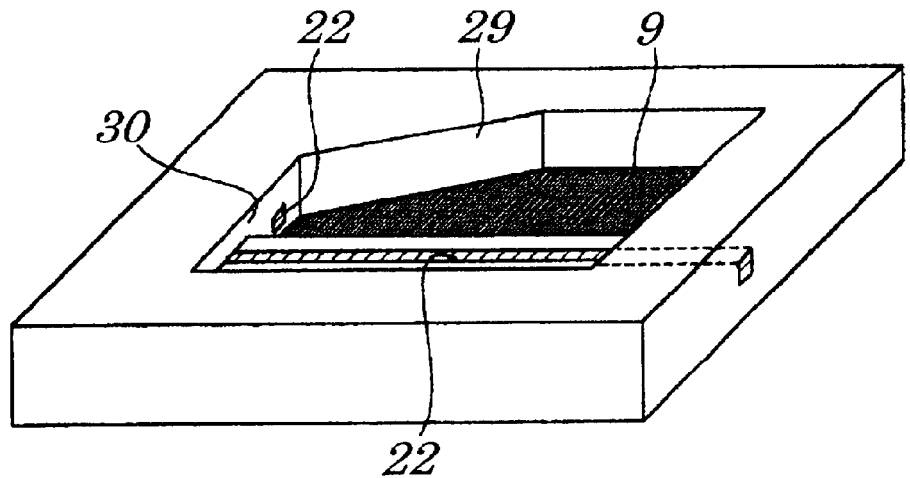
FIG. 29 is a perspective view showing a base substrate used in the optical waveguide path coupling structure of the sixth embodiment.
Figure 30:
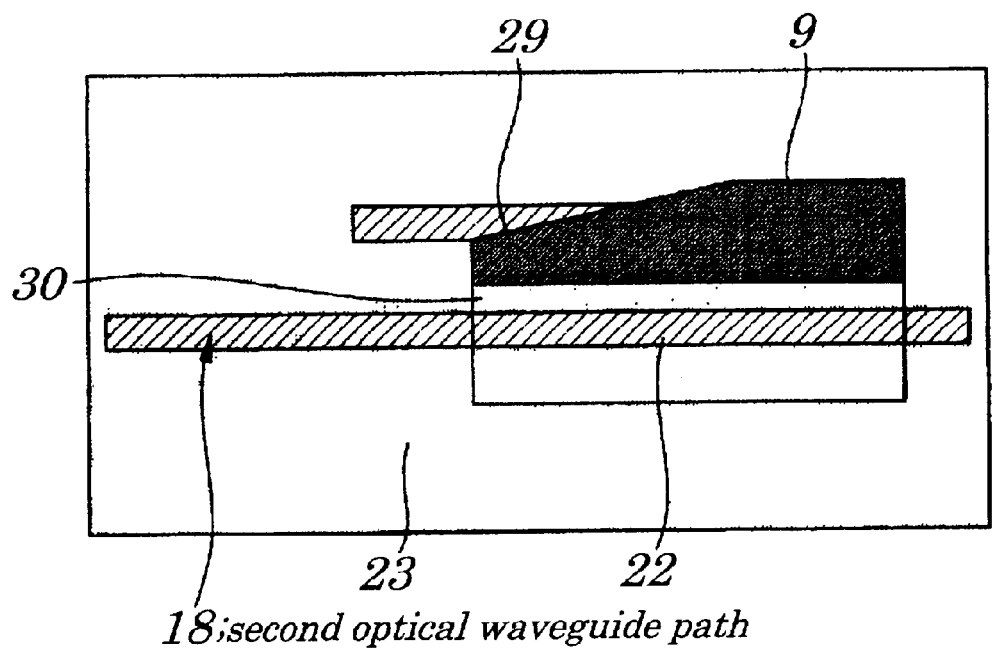
FIG. 30 is a plan view showing the base substrate used in the optical waveguide path coupling structure of the sixth embodiment.

FIG. 23 is the plan view showing the optical waveguide path coupling structure according to a sixth embodiment of the present invention, FIG. 24 is a line C—C cross sectional view of FIG. 23, FIG. 25 is a line D—D cross sectional view of FIG. 23, FIGS. 26A to 26D are process views sequentially showing manufacturing method of the optical waveguide path coupling structure, FIG. 27 is the process view sequentially showing the manufacturing method of the optical waveguide path coupling structure, FIGS. 28A to 28C are process views sequentially showing the manufacturing method of the optical waveguide path coupling structure, FIG. 29 is a perspective view showing a base substrate used in the optical waveguide path coupling structure, and FIG. 30 is the plan view showing the base substrate used in the optical waveguide path coupling structure.

A configuration of the optical waveguide path coupling structure of the sixth embodiment is largely different from that of the foregoing first embodiment in that a first optical waveguide path and a second optical waveguide path form a directional coupler.

In an optical waveguide path coupling structure 62, the first optical waveguide path 1 formed on an optical device chip 19 and the second optical waveguide path 18 formed on the base substrate 21 are coupled via a thin film layer 63, which is formed on a core layer of the first optical waveguide path 1 and has a refractive index smaller than that of the core layer, the hi directional coupler is formed by the first and second optical waveguide paths 1 and 18, and thus a configuration is made such that approximately 100% of light can be transmitted from one optical waveguide path to another optical waveguide path.

Next, the manufacturing method of the optical waveguide path coupling structure 62 will be described referring to FIG. 26A.

Firstly, as shown in FIG. 26A, a first film 5 is formed where the lower surface of the core layer 2 is coated by the lower clad layer 4 and its side is coated by a side clad layer 17. Then, the thin film layer 63 having a refractive index smaller than that of the core layer 2 is formed in a thickness of a few μm on an entire surface of the film 5. Further, a resin layer 40 having a same refractive index as that of the lower clad layer 4 is coated to the lower clad layer 4 and half-cured. Herein, the thin film layer 63 functions to form the directional coupler as described later.

Next, as shown in FIG. 26B, the core layer 2 is aligned with a light-emitting surface or the light-receiving surface of the optical device chip, pressurization/heating is applied to melt the resin layer 40, and the first film 5 is adhered to the surface of a semiconductor wafer 11.

Next, as shown in FIG. 26C, a hole section 49 reaching the resin layer 40 is formed on an upper area of the light-emitting surface or the light-receiving surface of the optical device chip 19 of the semiconductor wafer 11 by an ultraviolet laser processing unit 50. Then, a resin layer 60 having a same refractive index as that of the core layer 2 is filled in the hole section 49 and cured.

Next, as shown in FIG. 26D, an ultraviolet laser is irradiated tilting in a direction slanting by 45 degrees, and a specular surface 8 of approximately 45 degrees is formed at a position including the core layer 2. Then, a second cross section 16 is formed in an approximately vertical direction to a first cross section 15 at a position apart from the first cross section 15 by a predetermined distance with a similar method as the forming method of the first cross section 15. FIG. 27 is the plan view of the first optical waveguide path 1 at this point.

Next, as shown in FIG. 28A, a second film 25 coated by an upper clad layer 23 and a lower clad layer 24 is adhered to the base substrate 21 by using an adhesive agent having a same refractive index as that of the core layer 2. Further, metal masks 9 are formed on desired positions between the base substrate 21 and the lower clad layer 24 and between the core layer 22 and the upper clad layer 23.

Next, as shown in FIG. 28B, an alignment pattern portion of the upper clad layer 23 of the second film 25 is removed until the metal mask 9 by the ablation processing of the ultraviolet laser, and an opening 65 is formed. Accordingly, a cross section 29 corresponding to the first cross section 15 is formed on the base substrate 21, and the core layer for alignment is exposed. Then, a second cross section 30 corresponding to the second cross section 16 is formed at a position apart in the direction of the first cross section by a predetermined distance. Further, as shown in FIG. 28C, the metal mask 9 on the core layer 22 is removed. Accordingly, the second optical waveguide path 18 is formed on the base substrate 21.

Next, the first optical waveguide path 1 and the second optical waveguide path 18 are coupled to complete the optical waveguide path coupling structure 62. In this case, alignment of the first optical waveguide path 1 and the second optical waveguide path 18 in a horizontal direction is performed in such a manner that the first optical waveguide path 1 is aligned with the second optical waveguide path 18 by superposing the first cross sections 15 and 26 formed first, and putting together the second cross sections 16 and 30 with each other, as shown in FIG. 23 and FIG. 24. Then, the thin film layer 63 of the first optical waveguide path 1 is pushed against a surface of the core layer 22 of the second optical waveguide path 18. Accordingly, alignment along the optical path can be performed with high accuracy similarly to the first embodiment.

On the other hand, the directional coupler is formed because the core layers of the first optical waveguide path 1 and the second optical waveguide path 18 are coupled via the thin film layer 63 having the refractive index smaller than that of the core layer. In the directional coupler, a thickness of the thin film layer 63 and a length of contact between the both optical waveguide paths 1, 18 are formed such that the light transmits by 100% between the first optical waveguide path 1 and the second optical waveguide path 18. The configuration will be described in detail as follows.

Specifically, the first optical waveguide path 1 and the second optical waveguide path 18 are optically coupled by the directional coupler including the thin film layer 62 having a thickness of 1 µm in upper and lower connection regions and the core layers 2 and 22. If a relative index difference between the thin film layer 63 and the core layer is about 0.01, the directional coupler exudes an evanescent light that attenuates at a ratio of about $\exp(-2\cdot\pi\cdot((1-n^2)^{1/2})\cdot d/\lambda)$ and transmits it supposing that a value obtained by dividing the refractive index of the thin film layer 63 by the refractive index of the core layer 2, 22 is n, a wavelength of light is "λ", and thickness of the thin film layer 63 is "d". Herein, supposing the refractive index of the core layer 2, 22 is 1.535 and the refractive index of the thin film layer 63 is 1.530, n=0.9967 is obtained. And supposing that λ=1.3 µm, the light is halved at d=1.8 µm and becomes as small as ⅒ or less at d=6 µm. Therefore, the directional coupler has a mode coupling constant "κ" in which the light exudes from one core layer 2 (22) of the optical waveguide path 1 (18) to the other core layer 22 (2) of the optical waveguide path 18 (1) via the thin film layer 63. A value of a mode coupling constant is shown by the following equation supposing that the thickness of the core layer 2, 22 of the optical waveguide path is "t".

$$\kappa \sim (\lambda/t^2)\cdot\exp(-2\cdot\pi\cdot((1-n^2)^{1/2})\cdot d/\lambda) \quad \text{(Equation 1)}$$

Herein, a luminous flux quantity that moves from one core layer 2 (22) to the other core layer 22 (2) fluctuates periodically in accordance with a length "z" of the thin film layer 63 in a traveling direction of the light. Then, in the length "z" shown by the following equation 2, all luminous flux moves completely form one core layer 2 (22) of the optical waveguide path 1 (18) to the other core layer 22 (2) of the optical waveguide path 18 (1).

$$Z=(\pi/2)/\kappa \quad \text{(equation 2)}$$

Herein, supposing that n=0.9967, and t=10 µm and d=1 µm at the light of λ=1.3 µm. z=229 µm is obtained from the equations (1) and (2). Accordingly, the area of the thin film layer 63 is formed in a dimension with a distance of 229 µm in a traveling direction of the light. Specifically, the light of 100% is transmitted form one core layer 2 (22) of the optical waveguide path 1 (18)to the other core layer 22 (2) of the optical waveguide path 18 (1) by making the first optical waveguide path 1 and the second optical waveguide path 18 contact in a length of 229 µm via the thin film layer 63 having the thickness of 2 µm.

Note that the length of the thin film layer 63 may be made short to transmit a portion of the light from the second optical waveguide path 18 to the first optical waveguide path 1. In such a case, residual light other than the light that moved from the second optical waveguide path 18 to the first optical waveguide path 1 can be guided into the other first optical waveguide path 1 that is further coupled in a downstream of the second optical waveguide path 18.

With the configuration of the sixth embodiment, the following effects can be obtained in addition to the effects of the first embodiment.

Since there is no need to align the thickness of the optical waveguide paths 1, 18 in the height direction with high accuracy by making the first optical waveguide path 1 and the second optical waveguide path 18 contact in a vertical direction, conditions for manufacturing the optical waveguide path 1, 18 are loosened and manufacturing of the both optical waveguide paths 1, 18 becomes easier.

Seventh Embodiment

Figure 31:
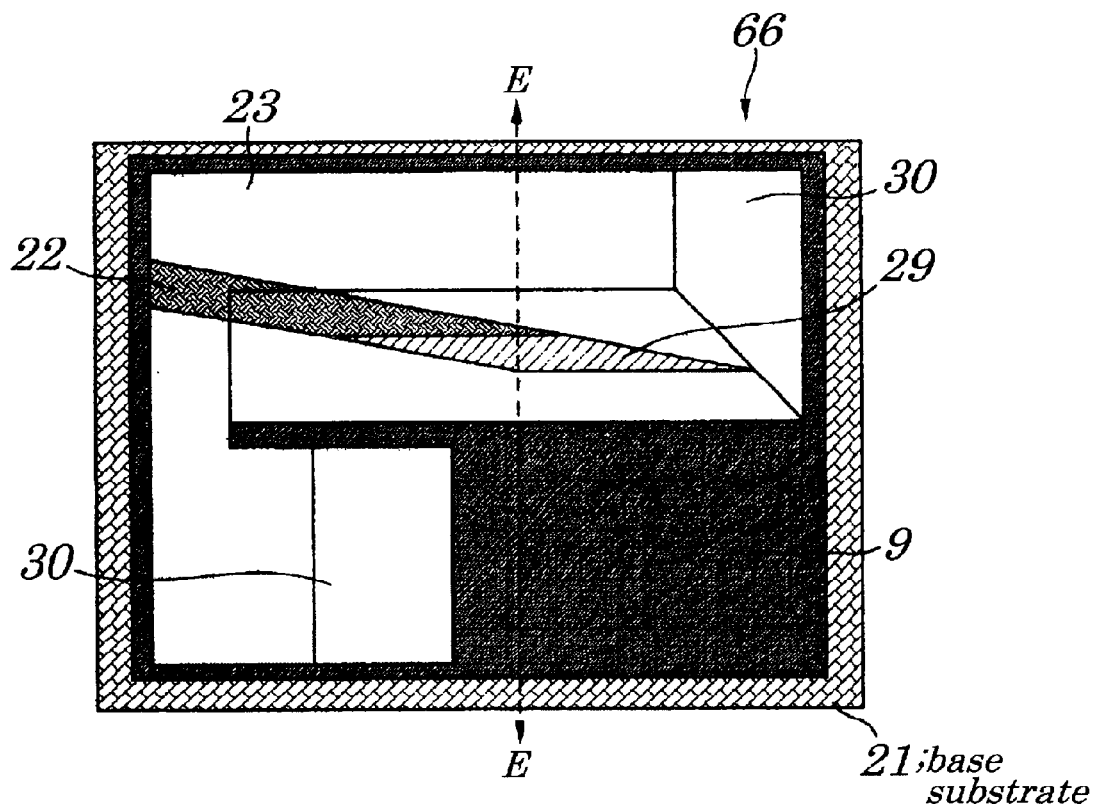
FIG. 31 is a plan view showing an optical waveguide path coupling structure of a seventh embodiment of the present invention.
Figure 32:
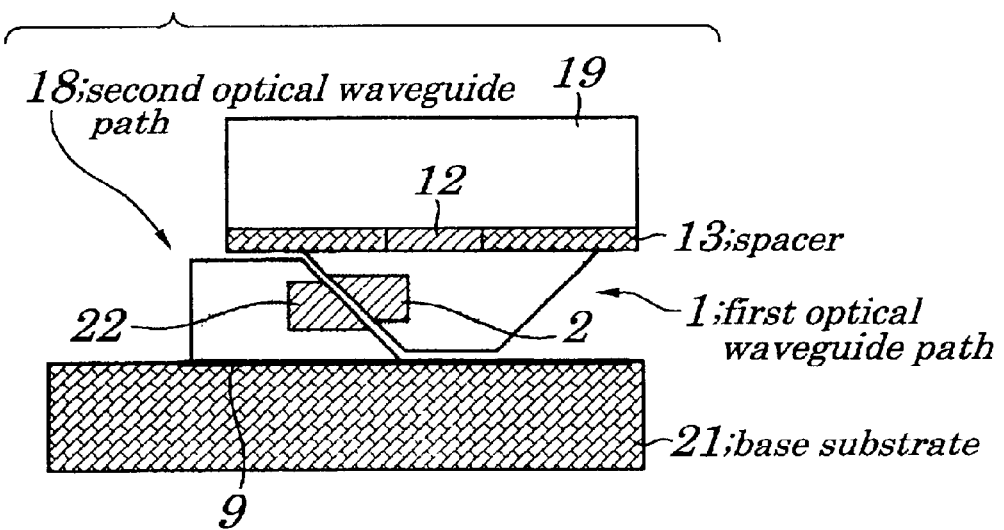
FIG. 32 is a line E—E cross-sectional view of FIG. 31.
Figure 33:
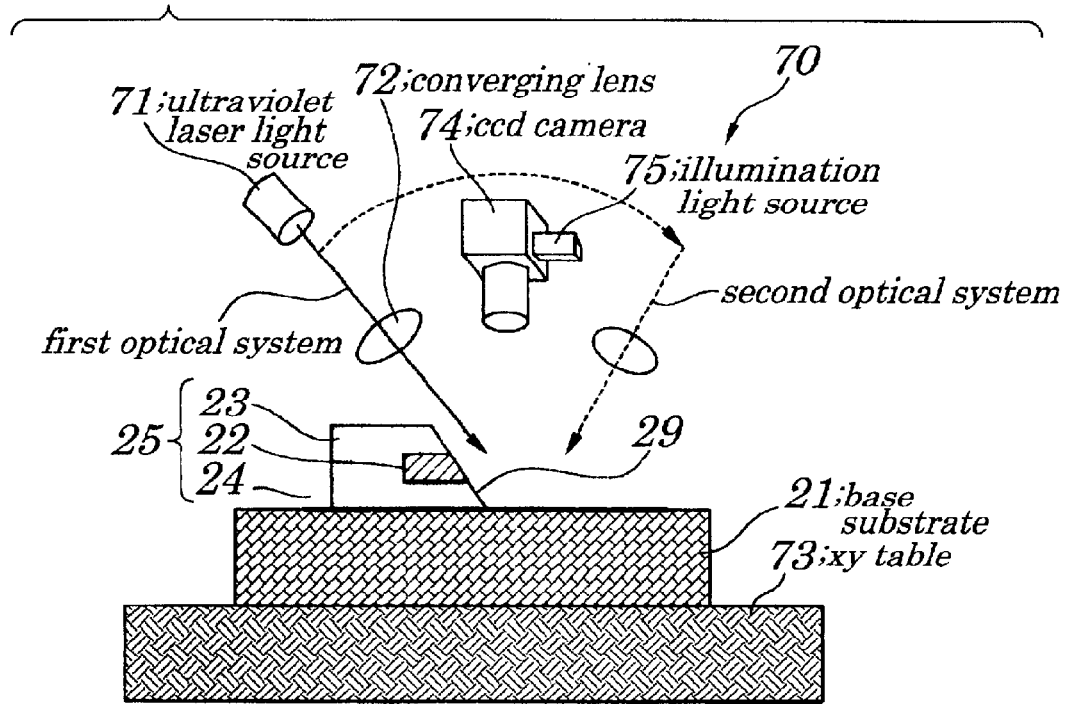
FIG. 33 is a view schematically showing a configuration of an ultraviolet laser processing unit used for manufacturing the optical waveguide path coupling structure of the seventh embodiment.
Figure 34:
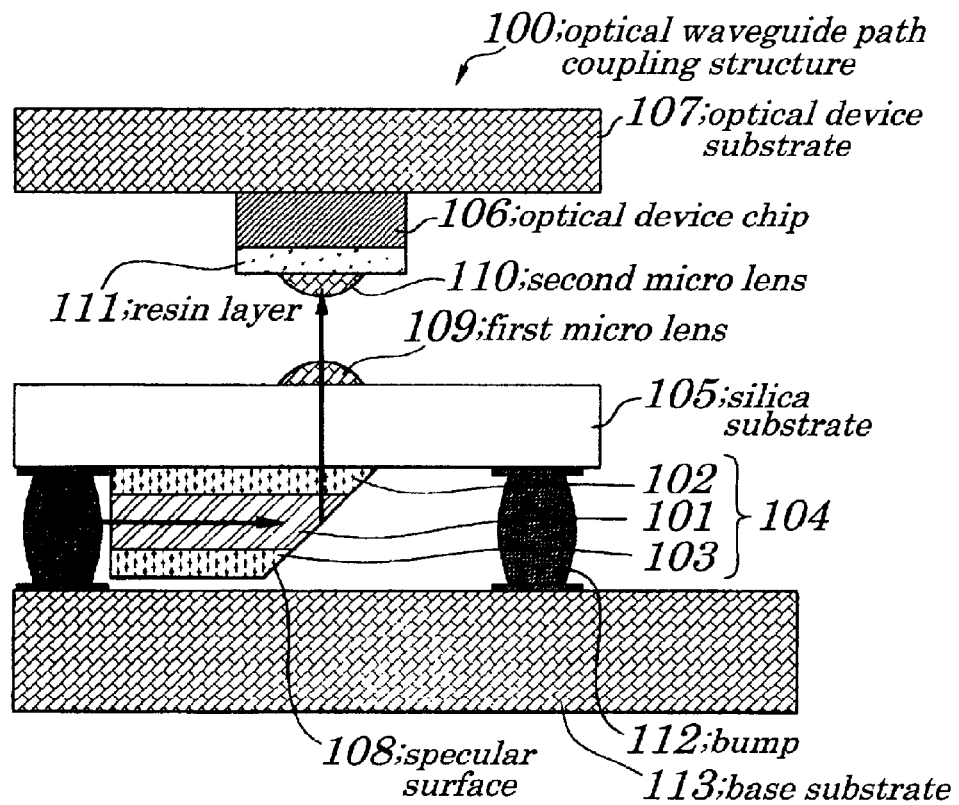
FIG. 34 is a side view showing a conventional optical waveguide path coupling structure.

FIG. 31 is a plan view showing an optical waveguide path coupling structure 66 according to a seventh embodiment of the present invention, FIG. 32 is a line E—E cross sectional view of FIG. 31, and FIG. 33 is a view schematically showing a configuration of an ultraviolet laser processing unit 70 used for manufacturing the optical waveguide path coupling structure 66.

A configuration of the optical waveguide path coupling structure 66 of the seventh embodiment is largely different from that of the foregoing second embodiment in that first and second cross sections 15, 16 of first and second optical waveguide paths 1, 18 are formed as a plane tilted to a base substrate 21.

In an optical waveguide path coupling structure 66, the first cross section 15 and the second cross section 16 of the first optical waveguide path 1 are formed as a slanted plane of approximately 45 degrees to the base substrate 21, and a first cross section 29 and a second cross section 30 of the second optical waveguide path 18 are also formed as a slanted plane of approximately 45 degrees to the base substrate 21 in a same manner.

According to this embodiment, a coupling portion of both first and second optical waveguide paths 1 and 18 can be easily checked from above the base substrate 21 when coupling the first optical waveguide path 1 and the second optical waveguide path 18, comparing to a structure in the second embodiment in which both the first cross sections (15 and 16) and second cross sections (29 and 30) of the first and second optical waveguide paths 1 and 18 are formed as vertical planes to the base substrate 21.

Formation of the first cross sections (15 and 16) and the second cross sections (29 and 30) is performed using an ultraviolet laser processing unit 70 as shown in FIG. 33. The ultraviolet laser processing unit 70 includes: an ultraviolet laser light source 71; an ultraviolet laser converging lens 72 that converges an ultraviolet ray generated from the ultraviolet laser source 71; an XY table that supports the base substrate 21 with the first optical waveguide path 1, which is an object to be processed; a CCD camera 74 that observes a processing portion of the object to be processed; and an illumination light source 75. Herein, the ultraviolet laser light source 71 is configured so as to be movable from a solid line position (a first optical system) to a broken line position (a second optical system) by a drive source (not shown). The first optical system irradiates a ultraviolet laser slanting by approximately 45 degrees to the second optical waveguide path 18 to form the first cross section 29, and the second optical system irradiates the ultraviolet laser slanting by approximately 45 degrees to the second optical waveguide path 18 to form the second cross section 30. A similar ultraviolet laser processing is performed to the first optical waveguide path 1.

Next, description will be made for a manufacturing method of the optical waveguide path coupling structure 66 referring to FIG. 31 and FIG. 32.

Firstly, a spacer 13 made of glass is adhered to an optical device chip 19. Then, the second optical waveguide path 18 is adhered to a surface of the base substrate 21 after forming a metal mask 9 as a base of an ultraviolet laser processing area. Next, the ultraviolet laser is irradiated slanting by approximately 45 degrees from the first optical system to the second optical waveguide path 18 by using the ultraviolet laser processing unit 70 to obliquely remove a core layer 22, an upper clad layer 23 and a lower clad layer 24, and thus the first cross section 15 is formed in a plane of slanting 45 degrees to the base substrate 21 and at a slight slope with the optical path direction of the second optical waveguide path 18. And then, the interfaces between the exposed core layer 22 and the upper/lower clad layers (23 and 24) are detected by the CCD camera 74.

Next, a position of an end portion of the core layer is measured, a processing position of the second cross section is calculated based on its coordinate, and the base substrate 21 is moved to the processing position by the XY table 73. Then, the ultraviolet laser is irradiated slanting by approximately 45 degrees from the second optical system to the second optical waveguide path 18 to obliquely remove the core layer 22, the upper clad layer 23 and the lower clad layer 24, and thus the second cross section 16 is formed. In the foregoing ultraviolet laser processing, the metal mask 9 works to protect a non-processing portion.

Next, ultraviolet laser processing is also applied to the first optical waveguide path 1 on the optical device chip 19 in the same manner as the case of the second optical waveguide path 18 to form the first cross section 15 corresponding to the first cross section 29 of the second optical waveguide path 18 and the second cross section 16 corresponding to the second cross section 30 of the second optical waveguide path 18. In this case, formation of the metal mask 9 is not necessary because the spacer 13 is including glass.

Next, as shown in FIG. 32, a height of the first optical waveguide path 1 and the second optical waveguide path 18 is aligned by using the spacer 13 as a common reference plane of the first optical waveguide path 1 and the second optical waveguide path 18 and by putting a surface of the second optical waveguide path 18 against the reference plane. Furthermore, alignment of the first optical waveguide 1 to the second optical waveguide path 18 in a horizontal direction is performed by putting together the first cross sections (15 and 29) and putting together the second cross sections (16 and 30). Then, a coupling portion of the first and second optical waveguide paths 1 and 18 is inspected while observing it from above the transparent spacer 13 with a microscope. In this case, inspection can be easily performed since the first cross sections (15 and 29) and the second cross sections (16 and 30) at the coupling portion are formed in slant planes slanting by 45 degrees.

With the configuration of the seventh embodiment, the following effects can be obtained in addition to effects of the first embodiment.

Since both the first cross sections (15 and 29) and the second cross sections (16 and 30) of the first and second optical waveguide paths 1 and 18 are formed as the slant planes having approximately 45 degrees, the coupling portion of the first and second optical waveguide paths 1 and 18 can be easily checked from above the base substrate 21.

It is apparent that the present invention is not limited to the above embodiments but may be changed and modified without departing from the scope and spirit of the invention. For example, in the case where the first cross section is formed so as to obliquely expose the core layer 22 of either the first optical waveguide path 1 or the second optical waveguide path 18 with the slight angle, description is made in an example where an angle is formed in approximately 6 degrees, but an effect is obtained when a value is within approximately 30 degrees. Herein, in the case of the angle of 30 degrees, the core layer width is exposed while expanded approximately twice. Furthermore, in the case where the first optical waveguide path 1 and the second optical waveguide path 18 are coupled, a method can be taken in which exposed planes are adhered by the adhesive agent, the exposed planes are made to contact with each other by pressurization or the like. Moreover, the thickness of the core layer, the upper clad layer 23, and the lower clad layer in each optical waveguide path 1, 18 is only one example, and an arbitrary change can be made according to a purpose, an application, or the like.

What is claimed is:

1. An optical waveguide path coupling structure where a first optical waveguide path including a first core layer and a second optical waveguide path including a second core layer are optically coupled, wherein;

said first optical waveguide path arranged on an optical device chip, which has a first cross section formed such that said first core layer is exposed as an oblique plane with a slight angle at an end portion and a second cross section formed in an approximately vertical direction to said first cross section at a position apart from said first cross section by a predetermined distance, and a second optical waveguide path arranged on a base substrate, which has a first cross section formed such that said second core layer is exposed as an oblique plane with a slight angle at an end portion and a second cross section formed in the approximately vertical direction to said first cross section at a position apart from said first cross section by a predetermined distance, are coupled by aligning said first cross sections and said second cross sections.

2. An optical waveguide path including a film in which upper and lower surfaces of a core layer are multiply coated respectively by an upper clad layer and a lower clad layer, wherein;

a first cross section is formed with a slight angle in an optical path direction at an end portion side of said core layer on said film to expose said core layer, and a second cross section is formed having a predetermined cross angle with said first cross section.

3. The optical waveguide path according to claim 2, wherein said first cross section is a plane approximately perpendicular to a plane of said film.

4. The optical waveguide path according to claim 2, wherein said first cross section is a plane forming a predetermined cross section non-perpendicular to a plane of said film.

5. An optical waveguide path comprising a film with a lower clad layer, a core layer, a thin film upper clad layer, and a side clad layer having approximately a same height as said core layer, wherein;

said core layer for alignment used as a pattern for alignment is formed on said film other than said core layer and a first cross section is formed with a slight angle to an optical path direction at an end portion side of said core layer for said alignment to expose said core layer for said alignment, and a second cross section is formed having a predetermined cross angle with said first cross section to expose an end surface of said core layer.

6. A manufacturing method of an optical waveguide path using a film in which upper and lower surfaces of a core layer are multiply coated respectively by an upper clad layer and a lower clad layer, the manufacturing method comprising the steps of:

forming a first cross section with a slight angle to an optical path direction at an end portion of said film;

measuring a position of said core layer exposed at said first cross section; and forming a second cross section with a predetermined angle from said optical path direction of said film at a position apart from said position of said core layer by a predetermined distance.

7. An optical device part with an optical waveguide path, comprising:

said optical waveguide path comprising a film in which upper and lower surfaces of a core layer are multiply coated respectively by an upper clad layer and a lower clad layer, wherein;

said film is provided on an optical device chip being a major portion of said optical device part and made to be a specular surface having a slope of approximately 45 degrees on an upper portion of a light-emitting surface or a light-receiving surface of said optical device chip, and a first cross section with a slight angle to an optical path direction is formed at an end portion side of said core layer of said film to expose said core layer.

8. The optical device part with the optical waveguide path according to claim 7, wherein a hole filled with resin having approximately a same refractive index as that of said core layer is formed from said specular surface having said slope approximately slanting by 45 degrees to said light-emitting surface or said light-receiving surface of said optical device chip.

9. The optical device part with the optical waveguide path according to claim 7, wherein a metal film is formed on said specular surface having said slope approximately slanting by 45 degrees and resin is coated on said specular surface.

10. The optical device part with the optical waveguide path according to claim 7, further comprising: a structure in which a spacer is adhered to said optical device chip and said film is formed on said spacer.

11. The optical device part with the optical waveguide path according to claim 10, comprising: said structure in which said spacer is formed by a transparent medium and said spacer is protruded from said optical device chip.

12. The optical device part with the optical waveguide path according to claim 7, wherein said first cross section is a plane approximately perpendicular to a plane of said optical device chip.

13. The optical device part with the optical waveguide path according to claim 7, wherein said first cross section is a plane with a predetermined angle non-perpendicular to a plane of said optical device chip.

14. The optical device part with the optical waveguide path according to claim 7, wherein;

the first cross section with a slight angle to an optical path direction is formed at said end portion side of said core layer of said film to expose said core layer and a second cross section is formed having a predetermined cross angle with said first cross section.

15. An optical device part provided with an optical waveguide path comprising a film with a lower clad layer, a core layer, a thin film upper clad layer, and a side clad layer having approximately a same height as said core layer, wherein;

said film is provided on an optical device chip being a major portion of said optical device part and made to be a specular surface having a slope of approximately 45 degrees on an upper portion of a light-emitting surface or a light-receiving surface of said optical device chip, and a core layer for alignment used as a pattern for alignment is formed on said film other than said core layer and a first cross section with a slight angle to an optical path direction is formed at an end portion side of said core layer for said alignment to expose said core layer for said alignment, and a second cross section is formed having a predetermined cross angle with said first cross section to expose an end surface of said core layer.

16. A coupling method of an optical waveguide path that couples a first optical waveguide path comprising a first film with a lower clad layer, a core layer, a thin film upper clad layer, and a side clad layer having approximately a same height as the core layer, and a second optical waveguide path comprising a second film with a similar configuration as the first film, wherein;

said first film is provided on an optical device chip and made to be a specular surface having a slope of approximately 45 degrees on an upper portion of a light-emitting surface or a light-receiving surface of said optical device chip, a first cross section with a slight angle to an optical path direction is formed at an end portion side of each of said core layers to expose said core layer on said first and second films, and a second cross section is formed having a predetermined cross angle with said first cross section, and a height is made to be said same by putting said first cross section and said second cross section of said second optical waveguide path against said first cross section and said second cross section of said first optical waveguide path and by putting surfaces of said first optical waveguide path and said second optical waveguide path against a reference plane common to both said first and said second optical waveguide paths.

17. A coupling method of an optical waveguide path that couples a first optical waveguide path comprising a first film with a lower clad layer, a core layer, a thin film upper clad layer, and a side clad layer having approximately a same height as the core layer, and a second optical waveguide path comprising a second film with a similar configuration as the first film, wherein;

said first film is provided on an optical device chip and made to be a specular surface having a slope of approximately 45 degrees on an upper portion of a light-emitting surface or a light-receiving surface of said optical device chip, core layers for alignment used as a pattern for alignment are formed on positions corresponding with each other on said first film and said second film other than said core layer, a first cross section with a slight angle to an optical path direction is formed at an end portion side of each of said core layers for said alignment to expose said core layers for said alignment, and a second cross section is formed having a predetermined cross angle with said first cross section to expose an end surface of said core layer, and said first cross section and said second cross section of said second optical waveguide path are put against said first cross section and said second cross section of said first optical waveguide path, and said thin film upper clad layer of said first optical waveguide path and said core layer of said second optical waveguide path are made to contact in a thickness direction.

* * * * *